(12) United States Patent  
Yasui et al.

(10) Patent No.: US 9,032,714 B2  
(45) Date of Patent: May 19, 2015

(54) EXHAUST PURIFICATION SYSTEM FOR INTERNAL COMBUSTION ENGINE

(71) Applicant: Honda Motor Co., Ltd., Tokyo (JP)

(72) Inventors: Yuji Yasui, Wako (JP); Hideki Matsunaga, Wako (JP); Naohiro Sato, Wako (JP); Masafumi Sakota, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 0 days.

(21) Appl. No.: 14/025,082

(22) Filed: Sep. 12, 2013

(65) Prior Publication Data  
US 2014/0069097 A1 Mar. 13, 2014

(30) Foreign Application Priority Data  
Sep. 13, 2012 (JP) .................. 2012-201879

(51) Int. Cl.  
*F01N 3/00* (2006.01)  
*F02D 41/02* (2006.01)  
*F02D 41/00* (2006.01)  
*F01N 3/10* (2006.01)  
(Continued)

(52) U.S. Cl.  
CPC ............. *F02D 41/0235* (2013.01); *F01N 3/101* (2013.01); *F02D 41/029* (2013.01); *F02D 41/1408* (2013.01); *F02D 41/1456* (2013.01); *F02D 41/1477* (2013.01); *F02D 41/0052* (2013.01); *F02D 2041/1432* (2013.01); *F01N 3/2066* (2013.01); *F01N 3/023* (2013.01); *F01N 2430/06* (2013.01); *F01N 2900/1602* (2013.01); *Y02T 10/47* (2013.01); *Y02T 10/22* (2013.01)

(58) Field of Classification Search  
USPC .................... 60/276, 278, 285, 286, 295, 311  
See application file for complete search history.

(56) References Cited

U.S. PATENT DOCUMENTS 5,083,427 A 1/1992 Anderson  
6,167,696 B1 * 1/2001 Maaseidvaag et al. ......... 60/274  
(Continued)

FOREIGN PATENT DOCUMENTS

DE 691 06 029 T2 5/1995  
DE 600 22 806 T2 3/2006  
(Continued)

OTHER PUBLICATIONS

Japanese Office Action dated Jun. 24, 2014, for corresponding Japanese Patent Appln. No. 2012-201879.

*Primary Examiner* — Binh Q Tran  
(74) *Attorney, Agent, or Firm* — Squire Patton Boggs (US) LLP

(57) ABSTRACT

An exhaust purification system is provided that can decrease the load acting on a device treating PM, even when switched to stoich operation. The exhaust purification system includes: a PM treatment device, a three-way purification catalyst, an LAF sensor, and an ECU (3) that performs feedback control so that an LAF sensor output (Vex) becomes a target value (Vop) determined so that the three-way purification reaction is optimized during stoich operation. The ECU (3) includes a fuel controller (32) that determines a fuel injection amount (Gfuel) so that a state in which an air/fuel ratio of the air/fuel mixture is leaner than stoich and a state richer than stoich are alternately realized by modulating a fuel correction amount (dGfuel) determined so as to cause the LAF sensor output (Vex) to converge to the target value (Vop) by employing a predetermined modulation algorithm.

19 Claims, 11 Drawing Sheets

(51) Int. Cl.
*F02D 41/14* (2006.01)
*F01N 3/20* (2006.01)
*F01N 3/023* (2006.01)

(56) References Cited

U.S. PATENT DOCUMENTS

| | | | |
|---|---|---|---|
| 6,679,050 B1 | 1/2004 | Takahashi et al. | |
| 6,978,603 B2 * | 12/2005 | Asanuma | 60/297 |
| 8,256,206 B2 * | 9/2012 | Wada et al. | 60/286 |
| 8,341,947 B2 | 1/2013 | Hepburn et al. | |
| 8,423,270 B2 * | 4/2013 | Reed et al. | 701/109 |
| 8,438,841 B2 * | 5/2013 | Bidner et al. | 60/295 |
| 8,464,522 B2 * | 6/2013 | Fujiwara et al. | 60/295 |

| | | |
|---|---|---|
| 2003/0131593 A1 | 7/2003 | Asanuma |
| 2010/0011749 A1 | 1/2010 | Fujiwara et al. |
| 2012/0031080 A1 | 2/2012 | Barasa |

FOREIGN PATENT DOCUMENTS

| | | |
|---|---|---|
| DE | 11 2008 000 369 T5 | 2/2010 |
| DE | 10 2010 046 762 A1 | 3/2011 |
| DE | 10 2011 108 908 A1 | 2/2012 |
| JP | 2003-206732 A | 7/2003 |
| JP | 2004-324455 A | 11/2004 |
| JP | 2009-036080 A | 2/2009 |
| JP | 2009-293585 A | 12/2009 |
| JP | 2010-013974 A | 1/2010 |
| JP | 2011-149360 A | 8/2011 |

\* cited by examiner

EXHAUST PURIFICATION SYSTEM FOR INTERNAL COMBUSTION ENGINE

This application is based on and claims the benefit of priority from Japanese Patent Application No. 2012-201879, filed on 13 Sep. 2012, the content of which is incorporated herein by reference.

BACKGROUND OF THE INVENTION

1. Field of the Invention

The present invention relates to an exhaust purification system for an internal combustion engine. More specifically, the present invention relates to an exhaust purification system for an internal combustion engine that switches at a predetermined condition between a lean operation mode that sets the air/fuel ratio of the air/fuel mixture sufficiently to the leans side from stoich and a stoich operation mode that sets the air/fuel ratio of the air/fuel mixture to stoich or the vicinity thereof.

2. Related Art

Exhaust purification systems for internal combustion engines purify HC (hydrocarbons), CO (carbon monoxide) and NOx (nitrogen oxides) contained in the exhaust gas of the engine. Exhaust purification systems that purify the above-mentioned three-way components in exhaust gas by employing the reactions on various types of catalysts provided in an exhaust channel have become mainstream. Among catalysts for purifying exhaust gas, various catalyst having different functions have been proposed, such as oxidation catalysts (DOC (Diesel Oxidation Catalyst)), three-way catalysts (TWC (Three-Way Catalyst)), NOx storage-reduction type catalysts (NSC (NOx Storage Catalyst)), and selective reduction catalysts (SCR catalyst (Selective Catalytic Reduction Catalyst)).

The oxidation catalyst has an oxidation function of purifying HC and CO by causing the oxidation reactions of HC and CO to advance under exhaust gas with the air/fuel ratio of the air/fuel mixture set to leaner than stoich containing an abundance of oxygen (exhaust gas with lean air/fuel ratio). In addition, this oxidation catalyst also has a three-way purification function whereby the oxidation reactions of HC and CO and the reduction reaction of NOx advance with high efficiency simultaneously under exhaust gas in which the air/fuel ratio of the air/fuel mixture is set to stoich (exhaust gas with stoich air/fuel ratio). The three-way catalyst corresponds to a catalyst produced by adding an oxygen storage material (OSC material) to the above-mentioned oxidation catalyst, and when compared with the above-mentioned oxidation catalyst, the three-way purification window, i.e. air/fuel ratio width exhibiting the three-way purification function, is wider. This effect arises due to the width of the air/fuel ratio fluctuation in the catalyst relative to the fluctuation in air/fuel ratio before the catalyst decreasing from the oxygen storage effect of the OSC material.

The selective reduction catalyst reduces NOx under the presence of a reducing agent supplied externally such as $NH_3$ or HC, or a reducing agent present in the exhaust gas. The NOx storage-reduction type catalyst stores NOx in the exhaust gas under exhaust gas with a lean air/fuel ratio, and reduces by way of a reducing agent the NOx stored under the exhaust gas with an equivalence ratio of stoich or richer than stoich. Exhaust purification systems for engines based on lean combustion such as a lean-burn type gasoline engine or diesel engine often use a catalyst called a DeNOx catalyst such as this selective reduction catalyst and NOx storage-reduction type catalyst, by combining with the aforementioned such oxidation catalyst or three-way catalyst, in order to maintain the NOx purification function under exhaust gas with a lean air/fuel ratio.

Patent Document 1 proposes an exhaust purification system combining, among the aforementioned such catalysts, the NOx storage-reduction catalyst and the three-way catalyst. This exhaust purification system sets the air/fuel ratio of the air/fuel mixture to stoich, prior to the NOx storage-reduction type catalyst reaching activation, and purifies the three-way components in the exhaust gas by way of the three-way catalyst mainly. In addition, this exhaust purification system sets the air/fuel ratio of the air/fuel mixture to leaner than stoich after the NOx storage-reduction type catalyst has reached activation, and purifies HC and CO with the three-way catalyst, as well as purifying NOx by way of the NOx storage-reduction type catalyst.

Patent Document 2 proposes, with regard to a system equipped with a three-way catalyst and a NOx storage reduction catalyst provided downstream of this three-way catalyst, technology for setting the air/fuel ratio to stoich in order to purify exhaust by way of the three-way catalyst, prior to the NOx storage reduction catalyst activating.

[Patent Document 1] Japanese Unexamined Patent Application, Publication No. 2011-149360

[Patent Document 2] Japanese Unexamined Patent Application, Publication No. 2009-293585

SUMMARY OF THE INVENTION

With the aforementioned such systems of Patent Documents 1 and 2, it is possible to always purify the three-way components in the exhaust gas with high efficiency by performing stoich operation intermittently in an engine based on lean operation. However, a cylinder-fuel injection engine such as a diesel engine or lean-burn direct injection gasoline engine tends to increase the amount of particulate matter discharged from the engine when causing the air/fuel ratio to change to the stoich side as shown in FIG. 11. In other words, when switching from lean operation to stoich operation, the amount of particulate matter discharged from the engine increases, and the load acting on the devices (filter, etc.) for treating this increases; however, adequate consideration is not given to this point by Patent Documents 1 and 2.

The present invention has an object of providing an exhaust purification system for an internal combustion engine that can decrease the load acting on devices treating particulate matter, even when switching to stoich operation.

In order to solve the above-mentioned problem, a first aspect of the present invention provides an exhaust purification system for an internal combustion engine (e.g., the engine 1 described later) that switches, at a predetermined condition, between lean operation that sets an air/fuel ratio of an air/fuel mixture to a leaner side than stoich and stoich operation that sets the air/fuel ratio of the air/fuel mixture to stoich or the vicinity thereof, the system comprising: a particulate matter treatment device (e.g., the PM treatment device 46 described later) that is provided in an exhaust channel (e.g., the exhaust channel 11 described later) of the engine and collects particulate matter in exhaust gas; a three-way purification catalyst (e.g., the three-way purification catalyst of the first catalytic converter 41 and three-way purification catalyst provided to the filter of the PM treatment device 46 described later) provided on an upstream side from the particulate matter treatment device in the exhaust channel to be integrated or separate from the particulate matter treatment device, and in which a three-way purification reaction progresses during the stoich operation; an exhaust gas sensor (e.g., the LAF sensor 21 described later) that outputs a detection value (Vex) according to an oxygen concentration of exhaust gas; and an air/fuel ratio control device (e.g., the ECU 3 described later) that sets an operating mode of the engine to stoich operation under a predetermined operating condition at which setting the operating mode of the engine to stoich operation can improve the NOx purification performance of the exhaust purification system overall over setting to lean operation, and that feedback controls so that a detection value of the exhaust gas sensor becomes a target value (Vop) established so that a three-way purification reaction in the three-way purification catalyst is optimized. The air/fuel ratio control device includes a fuel controller (e.g., the fuel controller 32 described later) that determines the fuel amount (Gfuel) to supply to the engine so that the air/fuel ratio of the air/fuel mixture becomes leaner than a predetermined period stoich during the stoich operation. It should be noted that, "stoich" in the present invention refers to the air/fuel ratio of the air/fuel mixture such that three-way purification reaction by way of a three-way purification catalyst provided to a particulate matter treatment device or an upstream side thereof is optimized, under predetermined conditions at which particulate matter discharged from the internal combustion engine is not oxidizing. Typically, this is 14.5 to 14.7 (A/F).

According to the first aspect, the air/fuel ratio control device sets the operating mode of the engine to stoich operation under a predetermined operating condition at which stoich operation is able to improve the NOx purification performance of the overall exhaust purification system more than lean operation, and performs feedback control so that the detection value (Vex) of the exhaust gas sensor becomes the target value (Vop) determined so that the three-way purification reaction on the three-way purification catalyst is optimized. HC, CO and NOx in the exhaust can thereby be purified at high efficiency by way of the three-way purification catalyst during stoich operation. In addition, upon performing such feedback control, the fuel controller determines the fuel amount to supply to the engine so that the air/fuel ratio of the air/fuel mixture becomes leaner than a predetermined period stoich. Since it is possible to contain oxygen, which is required in the oxidation of particulate matter, in the exhaust gas supplied to the particulate matter treatment device, the particulate matter being collected in the particulate matter treatment device can be oxidized for treatment, even during stoich operation. It is thereby possible to decrease the collected amount of particulate matter in the particulate matter treatment device during stoich operation, or suppress the increase thereof.

According to a second aspect of the present invention, it is preferable for the exhaust gas sensor to be provided on a downstream side of the particulate matter treatment device.

According to the second aspect, by providing the exhaust gas sensor on the downstream side of the particulate matter treatment device in the exhaust purification system of the present invention that performs feedback control so that the detection value of the exhaust gas sensor becomes a predetermined target value, it is possible to make the air/fuel ratio of the air/fuel mixture become leaner than a predetermined period stoich so that both the oxidation reaction in the particulate matter treatment device and the purification reaction in the three-way purification catalyst are optimized.

For example, in the case of a three-way purification catalyst being provided to the particulate matter treatment device, the air/fuel ratio of the air/fuel mixture at which the three-way purification of the three-way purification catalyst is optimized at conditions at which particulate matter deposits in the particulate matter treatment device and then this is oxidized will shift slightly to the lean side (high oxygen concentration side) compared to a case of particulate matter not oxidizing (stoich). This is because, when oxygen is consumed in the oxidation of particulate matter, the oxygen required in order to oxidize HC and CO is insufficient. On the other hand, when particulate matter oxidizes in the particulate matter treatment device, the oxygen concentration of the exhaust on the downstream side thereof declines by the amount consumed in oxidation. Therefore, in the case of providing the exhaust gas sensor on the downstream side of the particulate matter treatment device, the detection value of the exhaust gas sensor is shifted to the rich side (low oxygen concentration side) by the amount consumed in the oxidation of particulate matter in the particulate matter treatment device, even under a constant air/fuel ratio of the air/fuel mixture. For this reason, the detection value of the exhaust gas sensor when the three-way purification reaction on the three-way purification catalyst is optimized will be substantially constant, irrespective of the extent of progression of the oxidation of particulate matter in the particulate matter treatment device. Therefore, it is configured so that the air/fuel ratio of the air/fuel mixture will automatically become leaner than a predetermined period stoich even without performing a modulation operation on the fuel injection amount as described later, by performing feedback control so that the detection value of the exhaust gas sensor becomes the target value determined so that the three-way purification reaction on the three-way purification catalyst is optimized during stoich operation, whereby it is possible to decrease the collected amount of particulate matter in the particulate matter treatment device, or suppress an increase thereof, while purifying HC, CO and NOx in the exhaust at high efficiency.

In addition, also in a case of a three-way purification catalyst not being provided to the particulate matter treatment device itself, the detection value of the exhaust gas sensor provided on the downstream side of the particulate matter treatment device will shift to the rich side (low oxygen concentration side) by the amount consumed in oxidation, in a state in which particulate matter is depositing in the particulate matter treatment device, and then this is oxidizing. For this reason, it is configured so that the air/fuel ratio of the air/fuel mixture will automatically become leaner than a predetermined period stoich without even performing a modulation operation on the fuel injection amount as described later, by performing feedback control so that the detection value of the exhaust gas sensor becomes the target value determined so that the three-way purification reaction on the three-way purification catalyst is optimized during stoich operation, whereby it is possible to decrease the collected amount of particulate matter in the particulate matter treatment device, or suppress an increase thereof, while oxidizing HC and CO in the exhaust on the three-way purification catalyst provided separately from the particulate matter treatment device at high efficiency.

According to a third aspect of the present invention, it is preferable for the fuel controller to determine a fuel amount (Gfuel) so that a state in which the air/fuel ratio of the air/fuel mixture is leaner than stoich and a state richer than stoich are alternately realized, by applying a predetermined modulation algorithm to modulate the fuel amount (dGfuel or Gfuel_bs+ dGfuel) determined so as to cause the detection value of the exhaust gas sensor to converge to the target value based on a predetermined feedback control algorithm.

According to the third aspect of the present invention, since it is possible to realize a state in which the air/fuel ratio is leaner than stoich intermittently while causing the detection value of the exhaust gas sensor to converge to the target value with high precision, oxidation of particulate matter can be reliably performed in addition to the purification of CO, HC and NOx in the exhaust gas.

According to a fourth aspect of the present invention, it is preferable for the fuel controller to set a variation width of the air/fuel ratio of the air/fuel mixture from stoich to a lean side to within 0.3 (A/F).

According to the fourth aspect, since there is a lag characteristic in the exhaust gas flow in the exhaust system, it is possible to make the air/fuel ratio of the air/fuel mixture change so that a state leaner than stoich and a state richer than stoich are alternately realized, while causing the detection value of the exhaust gas sensor to converge to the target value. However, when setting the air/fuel ratio of the air/fuel mixture to lean, if the fuel amount is decreased excessively, the reduction of NOx may no longer sufficiently progress on the three-way purification catalyst. Therefore, with the present invention, it is possible to achieve both the purification of CO, HC and NOx as well as the oxidation of particulate matter, by setting the variation width of the air/fuel ratio of the air/fuel mixture from stoich to the lean side to within 0.3 (A/F).

It should be noted, in the case of intermittently setting the air/fuel ratio of the air/fuel mixture to leaner than stoich by a modulation operation as in the invention described in the third aspect, it is a matter of course that it is preferable for the variation width of the air/fuel ratio of the air/fuel mixture from stoich to the lean side to be set within 0.3 (A/F) irrespective of the means for leaning, such as a case such that the air/fuel ratio is offset to the lean side by a timer or the like, or a case such that the air/fuel ratio of the air/fuel mixture is automatically made leaner than stoich based on the output of the exhaust gas sensor on the downstream side of the particulate matter treatment device as in the invention of the second aspect.

According to a fifth aspect of the present invention, it is preferable for the fuel controller to include: a reference fuel amount calculation unit that calculates a reference fuel amount (Gfuel_bs) based on the operating mode and operating state of the engine; a fuel correction amount calculation unit (e.g., the fuel control SMC 321 described later) that calculates a fuel correction amount (dGfuel) for the reference fuel amount (Gfuel_bs) so as to cause the detection value (Vex) of the exhaust gas sensor to converge to the target value (Vop), based on a predetermined feedback control algorithm; and a modulator (e.g., the modulator 322 described later) that applies a predetermined modulation algorithm to modulate the fuel correction amount, and calculates a modulated correction amount (dGfuel_mod), and for the fuel controller to determine a fuel amount by adding the modulated correction amount to the reference fuel amount.

According to the fifth aspect of the present invention, by modulating the fuel correction amount determined based on a predetermined feedback control algorithm by employing a predetermined modulation algorithm and determining the fuel amount by adding this to a reference fuel amount, it is possible to alternately realize a state in which the air/fuel ratio of the air/fuel mixture is leaner than stoich, and a state richer than stoich, while causing the detection value of the exhaust gas sensor to converge to the target value with high precision. Oxidation of particulate matter can thereby be performed reliably, in addition to the purification of CO, HC and NOx in the exhaust gas.

According to the sixth aspect of the present invention, it is preferable for an amplitude (dGfuel) of the fuel correction amount to a lean side or an amplitude (ΔGfuel) of the modulated correction amount to the lean side to be limited so as to be no more than 0.3 (A/F) by conversion to air/fuel ratio of the air/fuel mixture.

According to the sixth aspect of the present invention, by limiting the amplitude of the modulated correction amount corresponding to the output of the modulator to the lean side, or amplitude of the fuel correction amount corresponding to the input to the modulator so as to be no more than 0.3 (A/F) by conversion to air/fuel ratio of the air/fuel mixture, it is possible to achieve both purification of CO, HC and NOx, as well as oxidation of particulate matter.

According to a seventh aspect of the present invention, it is preferable for the fuel controller to modulate the fuel amount determined based on the feedback control algorithm only when during stoich operation and particulate matter collected in the particulate matter treatment device oxidizes.

According to the seventh aspect, the particulate matter having deposited in the PM treatment device can only be oxidized and removed if exhaust gas containing oxygen is supplied after having reached a predetermined combustion temperature. Therefore, with the present invention, it is possible to reliably remove particulate matter during stoich operation by modulating the above-mentioned fuel amount by way of the modulator only in a case such that the particulate matter collected in the particulate matter treatment device oxidizes. In addition, although the engine torque may change and the driveability decline when causing the fuel amount to vary, it is possible to prevent an unnecessary decline in driveability by choosing a time period in which particulate matter can be oxidized to modulate as in the present invention.

According to an eighth aspect of the present invention, it is preferable for the exhaust purification system to further include an exhaust recirculation device (e.g., the EGR device 5 described later) that recirculates a part of the exhaust gas of the engine to intake air, in which the air/fuel ratio control device includes an air controller (e.g., the air controller 33 described later) that calculates an exhaust recirculation rate (Regr) or exhaust recirculation amount for controlling so as to cause the detection value (Vex) of the exhaust gas sensor to converge to the target value (Vop), based on a predetermined feedback control algorithm.

According to the eighth aspect, by correcting the exhaust recirculation rate or exhaust recirculation amount so as to cause the detection value of the exhaust gas sensor to converge to the target value in the present invention, it is possible to decrease the variation width of the fuel amount by this amount. For this reason, it is possible to simultaneously achieve purification of HC, CO and NOx, oxidation of particulate matter and an improvement in driveability.

According to a ninth aspect of the present invention it is preferable for the convergence rate of the detection value of the exhaust gas sensor to the target value to be set by the fuel controller so as to be faster than the convergence rate according to the air controller.

According to the ninth aspect, it is thereby made possible to cause the detection value of the exhaust gas sensor to converge to the target value with high precision, while avoiding interference between fuel control and exhaust recirculation control, and it is possible to achieve both purification of CO, HC and NOx as well as oxidation of particulate matter with high efficiency.

According to a tenth aspect of the present invention, it is preferable for the exhaust purification system to further include an additive supply device (e.g., the additive supply device 8 described later) that supplies, to fuel to be supplied to the engine, an additive for causing a combustion temperature of particulate matter to decrease in the particulate matter treatment device.

According to the tenth aspect of the present invention, by supplying additive to the fuel, it is possible to widen the operating region in which particulate matter can be treated during stoich operation. Therefore, since the rate at which the deposited amount of particulate matter increases in the particulate matter treatment device can be decreased, the particulate matter treatment device can be reduced in size. As a result thereof, the fuel economy of the vehicle can also be improved.

According to an eleventh aspect of the present invention, it is preferable for a first catalytic converter (e.g., the first catalytic converter 41 described later) including the three-way purification catalyst to be provided in the exhaust channel on an upstream side from the particulate matter treatment device, and a second catalytic converter (e.g., the second catalytic converter 42 described later) that purifies NOx in exhaust gas during lean operation to be provided downstream from the particulate matter treatment device.

With the present invention according to the eleventh aspect, by providing the second catalytic converter that purifies NOx during lean operation to the downstream side from the first catalytic converter and particulate matter treatment device, it is possible to purify CO and HC with the first catalytic converter, and purify NOx with the second catalytic converter during lean operation.

According to a twelfth aspect of the present invention, it is preferable for the predetermined operating condition to include a case of the second catalytic converter not having reached activation thereof, and a case of a value of a NOx correlation parameter which increases in accordance with a NOx amount discharged from the engine being greater than a predetermined value.

According to the twelfth aspect, in a case of the second catalytic converter not having reached activation, NOx cannot be sufficiently purified by the second catalytic converter, even if setting the operating mode to lean operation. In addition, even if the second catalytic converter has reached activation, it may be more preferable to purify NOx by employing the three-way purification reaction of the first catalytic converter, than purifying NOx with the second catalytic converter, to raise the overall NOx purification performance of the exhaust purification system when the NOx amount discharged from the engine is great. With the present invention, by setting the operating mode to stoich operation under such operating conditions, it is possible to prevent deterioration in the fuel economy due to setting to stoich operation at more than the required frequency.

According to the present invention, it is possible to oxidize to purify particulate matter that is collecting in the particulate matter treatment device, even during stoich operation.

DETAILED DESCRIPTION OF THE INVENTION

Figure 1:
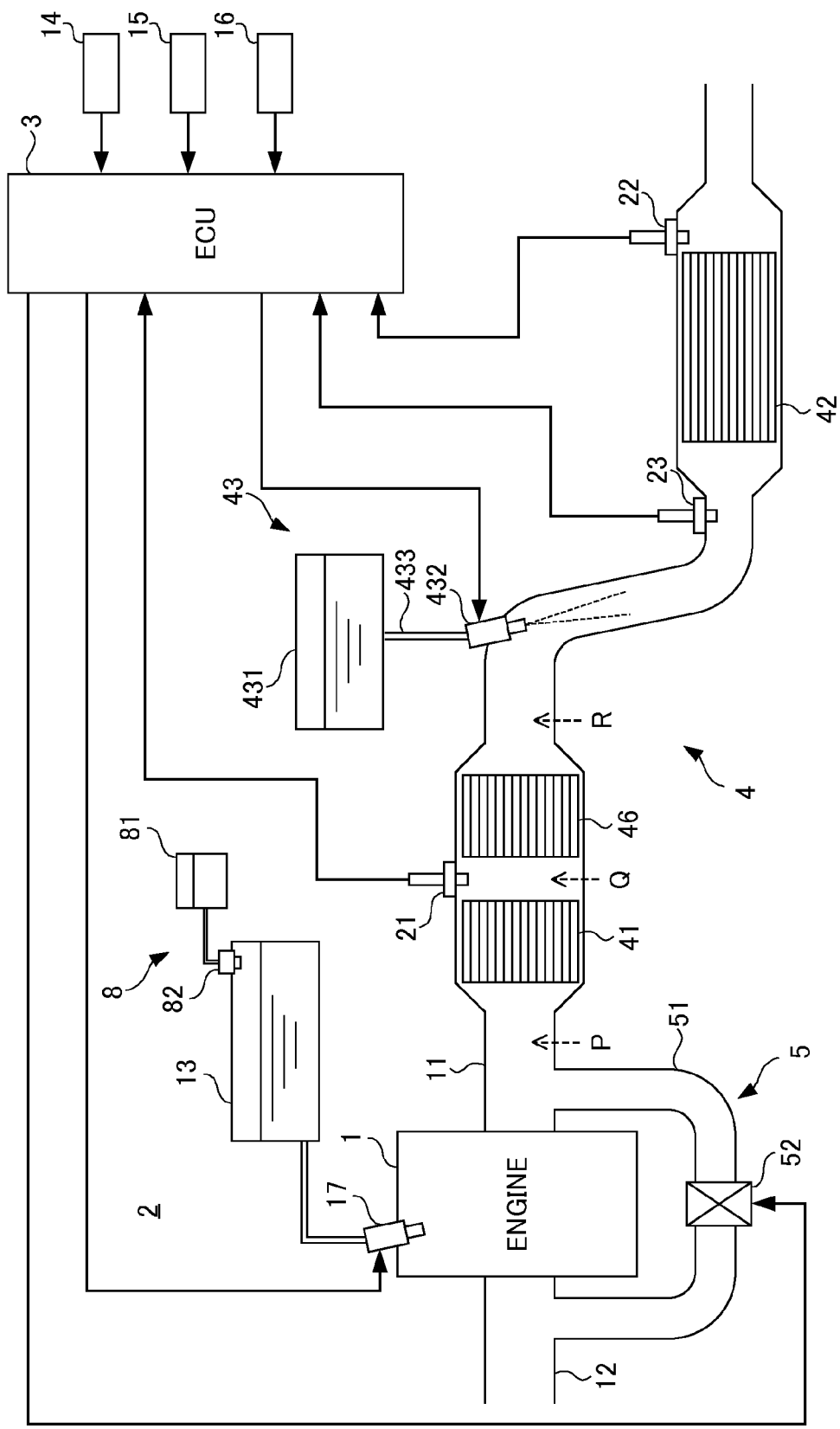
FIG. 1 is a schematic view showing the configuration of an engine and an exhaust purification system thereof according to an embodiment of the present invention.

Hereinafter, an embodiment of the present invention will be explained while referring to the drawings.

FIG. 1 is a schematic diagram showing configurations of an internal combustion engine (hereinafter referred to as "engine") 1 and an exhaust purification system 2 thereof according to the present embodiment. The engine 1 is a diesel engine, lean burn gasoline engine or the like based on so-called lean combustion which sets the air/fuel ratio of the air/fuel mixture to a leaner side than stoich. As described in detail later, the engine 1 is selectively operated in the two operating modes of lean operation that sets the air/fuel ratio of the air/fuel mixture to a leaner side than a predetermined stoich, and stoich operation that sets the air/fuel ratio of the air/fuel mixture to stoich or the vicinity thereof. It should be noted that "stoich" hereinafter refers to the air/fuel ratio of the air/fuel mixture such that, under specific conditions at which particulate matter does not oxidize inside of an exhaust channel 11, a three-way purification reaction by way of a three-way purification catalyst provided to a direct-downstream catalytic converter 41, PM treatment device 46, and the like described later is optimized.

The exhaust purification system 2 is configured to include a catalytic purification device 4 provided in the exhaust channel 11 of the engine 1, an EGR device 5 that recirculates a portion of the exhaust gas flowing through the exhaust channel 11 into an intake channel 12, an additive supply device 8 that supplies an additive to the fuel supplied to the engine 1, and an electronic control unit (hereinafter referred to as "ECU") 3 as an air/fuel ratio control device.

Fuel injectors 17 that inject fuel to the respective cylinders are provided to the engine 1. An actuator that drives this fuel injector 17 is electromagnetically connected to the ECU 3. The ECU 3 determines a fuel injection amount from the fuel injector 17 according to a sequence described in detail later, and controls the fuel injector 17 so that a determined fuel injection situation is realized.

The catalytic purification device 4 includes a first catalytic converter 41 provided on an upstream side in the exhaust channel 11, a PM treatment device 46 provided on a downstream side from this first catalytic converter 41, a second catalytic converter 42 provided on a downstream side from the PM treatment device 46, and a reducing agent supply device 43 that supplies reducing agent to the second catalytic converter 42. The first catalytic converter 41 is provided immediately after the engine 1 in the exhaust channel 11. Therefore, the first catalytic converter is referred to as direct-downstream catalytic converter hereinafter. In addition, the second catalytic converter 42 is provided at a position separated from the engine 1, more specifically, under the floor in a state in which the exhaust purification system 2 is equipped to a vehicle, which is not illustrated. Therefore, the second catalytic converter is referred to as under-floor catalytic converter hereinafter. A catalyst for promoting reactions to purify components such as HC, CO and NOx contained in the exhaust gas are respectively provided to the direct-downstream catalytic converter 41 and the under-floor catalytic converter 42.

A three-way purification catalyst at least having a three-way purification function is used in the direct-downstream catalyst equipped to the direct-downstream catalytic converter 41. Three-way purification function refers to a function of a three-way purification reaction, i.e. reaction in which the oxidations of HC and CO and reduction of NOx are carried out simultaneously, processes under stoich air/fuel ratio exhaust gas. As a catalyst having such a three-way purification function, an oxidation catalyst, three-way catalyst and NOx storage reduction-type catalyst can be exemplified. Any one of these three catalysts is preferably used in the direct-downstream catalyst.

An oxidation catalyst (DOC) purifies HC, CO and NOx according the above-mentioned three-way purification reaction under exhaust gas with a stoich air/fuel ratio, and purifies by oxidizing HC and CO under exhaust gas with a lean air/fuel ratio.

The three-way catalyst (TWC) corresponds to a catalyst produced by adding an oxygen storage material to this oxidation catalyst. The three-way catalyst and oxidation catalyst have fundamentally the same purification function. However, the three-way catalyst excels in the aspect of the three-way purification window being wider compared to the oxidation catalyst.

The NOx storage-reduction type catalyst (NSC) purifies HC, CO and NOx by way of a three-way purification reaction similarly to the above-mentioned oxidation catalyst under exhaust gas with a stoich air/fuel ratio, and purifies by storing NOx under exhaust gas with a lean air/fuel ratio. It should be noted that the stored NOx is released by setting the air/fuel ratio of exhaust gas to stoich or the richer side of stoich, and is reduced with HC contained in the exhaust gas serving as a reducing agent.

Figure 2:
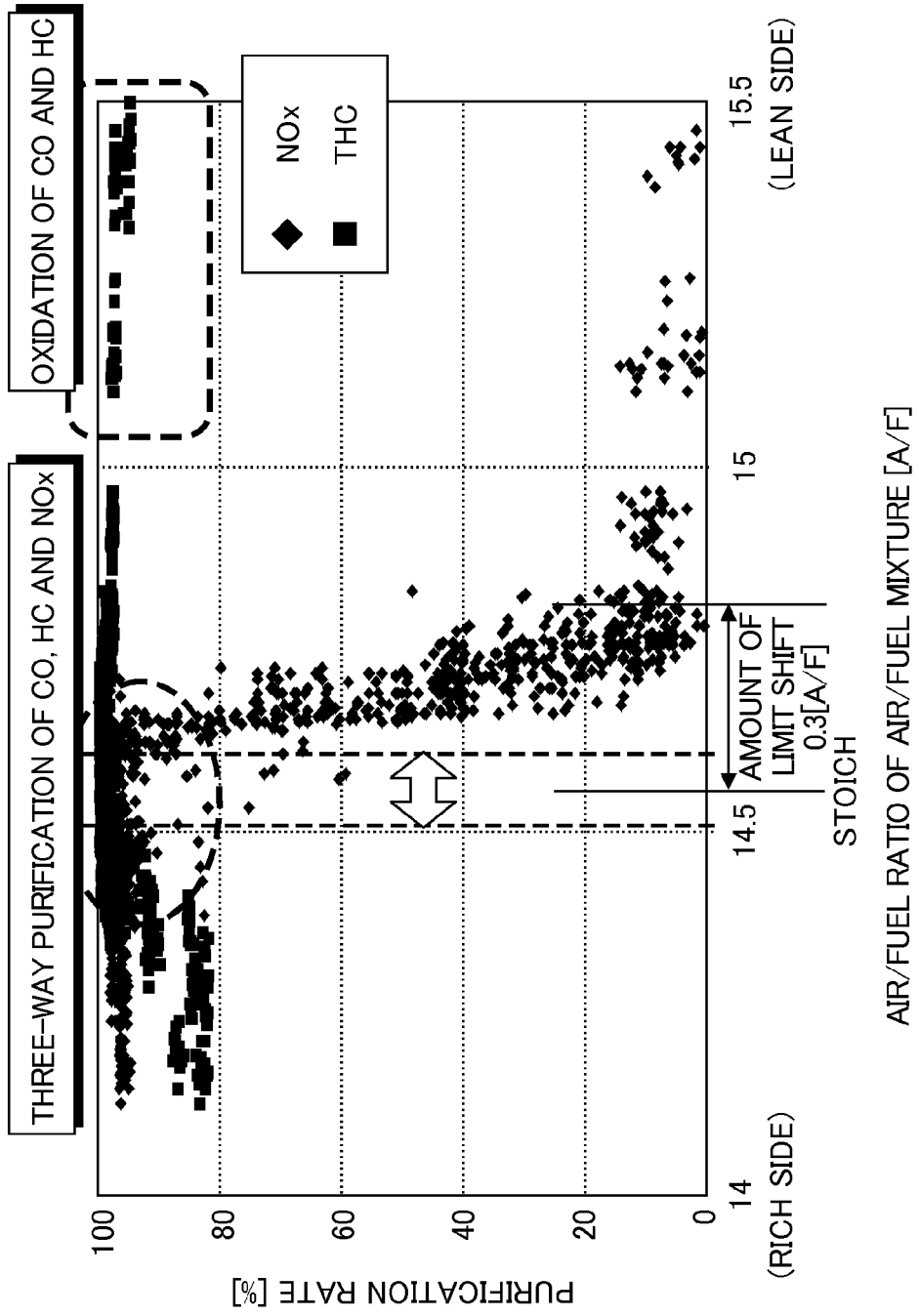
FIG. 2 is a graph showing a relationship between purification performance of a direct-downstream catalytic converter and the air/fuel ratio.

FIG. 2 is a graph showing the relationship between the purification performance and air/fuel ratio of the direct-downstream catalytic converter 41.

More specifically, it is a graph plotting the purification rate of THC (total hydrocarbons) and NOx when changing the air/fuel ratio of the air/fuel mixture to 14.0 to 15.5 (A/F). It should be noted that, although FIG. 2 shows an example using a three-way catalyst as the direct-downstream catalyst, a case of using an oxidation catalyst or NOx storage reduction-type catalyst as the direct-downstream catalyst is qualitatively the same.

As shown in FIG. 2, the oxidation of HC and CO is promoted as the oxygen concentration of the exhaust gas rises; however, it becomes difficult for the reduction of NOx to advance. For this reason, when setting the air/fuel ratio of the air/fuel mixture to stoich (in the example shown in FIG. 2, about 14.55 (A/F)) or the vicinity thereof at the direct-downstream catalytic converter 41, the three-way purification reaction is optimized and HC, CO and NOx are purified with high efficiency. The air/fuel ratio band in which this three-way purification function is realized with sufficient efficiency (in FIG. 2, three-way catalyst window demarcated by dashed line) differs depending on the amount of OSC material. In addition, as shown in FIG. 2, the NOx purification performance from the direct-downstream catalytic converter 41 has a characteristic of remarkably declining when leaving from stoich to the lean side.

In addition, although FIG. 2 shows the purification performance of the direct-downstream catalytic converter 41, if a case in which PM is not depositing on the PM treatment device 46, the combined overall purification performance of the direct-downstream catalytic converter 41 and PM treatment device 46 also is qualitatively the same as that shown in FIG. 2.

Referring back to FIG. 1, the configuration of the under-floor catalytic converter 42 will be explained. In the under-floor catalyst equipped to the under-floor catalytic converter 42, a catalyst is used on which the NOx purification reaction advances during lean operation, i.e. under exhaust gas with a lean air/fuel ratio in which oxygen is contained in abundance. As a catalyst providing such NOx purification performance, in addition to the aforementioned NOx storage-reduction type catalyst, a selective reduction catalyst can be exemplified.

The selection reduction catalyst (SCR catalyst) reduces NOx under the presence of a reducing agent supplied from outside such as $NH_3$ or HC, or under the presence of HC present in exhaust gas. It should be noted that the present embodiment explains an example in which the under-floor catalyst is established as a selective reduction catalyst. The modified points in the case of establishing the under-floor catalyst as a NOx storage-reduction type catalyst will be explained while referencing FIG. 10 later.

It should be noted that the direct-downstream catalytic converter 41 is provided at a position closer to the engine 1 than the under-floor catalytic converter 42 and, therefore, achieves activation immediately after startup of the engine 1 more quickly than the under-floor catalytic converter 42.

The reducing agent supply device 43 includes a urea water tank 431 and urea water injector 432. The urea water tank 431 stores urea water, which is a precursor of the reducing agent ($NH_3$) for the under-floor catalytic converter 42. The urea water tank 431 is connected to the urea water injector 432 via a urea water supply pipe 433 and a urea water pump not illustrated. The urea water injector 432 opens and closes when driven by an actuator (not illustrated) to inject urea water supplied from the urea water tank 431 into the exhaust channel 11 on an upstream side of the under-floor catalytic converter 42. The urea water injected from the injector 432 is hydrolyzed to $NH_3$ in the exhaust gas or under-floor catalytic converter 42, and is consumed in NOx reduction. The actuator of the urea water injector 432 is electromagnetically connected to the ECU 3. The ECU 3 calculates the required urea water injection amount depending on the output of a NOx sensor 22 described later, as well as controlling the urea water injector 432 so that the urea water of an amount in accordance with this injection amount is injected. It should be noted that a detailed explanation of urea water injection control by the ECU 3 is omitted.

The PM treatment device 46 is a filter that collects particulate matter (hereinafter particulate matter is simply referred to as "PM") in the exhaust gas from the engine 1. The PM collected by the PM treatment device 46 combusts when reaching the temperature at which PM combusts and entering an oxidative atmosphere. In this filter, a catalyst having a three-way purification function such as an oxidation catalyst and three-way catalyst is provided, similarly to the aforementioned direct-downstream catalytic converter 41. Herein, the temperature at which PM collected in the PM treatment device 46 combusts is more specifically at least about 300° C. However, in the case of combusting fuel to which a fuel additive has been added by the additive supply device 8 described later in the engine 1, this PM combustion temperature declines to on the order of 150° C., which is the temperature that can be sufficiently reached in a normal traveling state.

The EGR device 5 is configured to include an EGR channel 51, EGR control valve 52, EGR cooler that is not illustrated, etc. The EGR channel 51 connects an upstream side from the direct-downstream catalytic converter 41 in the exhaust channel 11 with the intake channel 12. The EGR control valve 52 is provided in the EGR channel 51, and controls the amount of exhaust gas recirculated into the cylinders of the engine 1 via this EGR channel 51 (hereinafter referred to as "EGR gas"). The actuator driving this EGR control valve 52 is electromagnetically connected to the ECU 3. The ECU 3 calculates, according to processing not illustrated, an estimated value of an EGR rate (or EGR gas amount) corresponding to a proportion of the EGR gas amount making up the total gas amount introduced into the cylinders of the engine 1, as well as determining a target value of the EGR rate (or EGR gas amount) according to the sequence described in detail later, and controlling the EGR control valve so that this estimated value becomes the target value.

The additive supply device 8 includes an additive tank 81 that stores the additive for causing the PM oxidation temperature to decrease, and an additive supply valve 82 that supplies additive to the fuel tank 13 in which the fuel supplied to the engine 1 is stored. The additive supply valve 82 supplies additive of an amount in accordance with a refueling amount upon fuel being refilled in the fuel tank 13. The additive concentration of the fuel in the fuel tank 13 thereby is kept substantially constant, and the PM combustion temperature is also kept constant.

As sensors for detecting the states of the exhaust purification system 2 and engine 1, an exhaust gas sensor 21, NOx sensor 22, exhaust temperature sensor 23, crank angle position sensor 14, accelerator aperture sensor 15, air flow sensor 16 and the like are connected to the ECU 3.

The exhaust gas sensor 21 outputs a detection signal Vex according to the oxygen concentration of the exhaust gas inside of the exhaust channel 11. A sensor called an $O_2$ sensor or a sensor called an LAF sensor is used as this exhaust gas sensor 21. $O_2$ sensor is a sensor that outputs a detection signal according to the oxygen concentration of the exhaust gas; however, there is an output characteristic of suddenly changing in the vicinity of the exhaust gas air/fuel ratio corresponding to the air/fuel mixture in the vicinity of stoich (refer to FIG. 7 described later). In contrast, the LAF sensor linearly detects the oxygen concentration in the exhaust gas relative to a wide range of exhaust gas air/fuel ratios, and outputs a detection signal corresponding to the exhaust gas air/fuel ratio according to the oxygen concentration (refer to FIG. 8 described later). Hereinafter, the exhaust gas sensor 21 is established using the LAF sensor; however, it is not to be limited thereto.

In addition, this exhaust gas sensor 21 is provided at any among an upstream side from the direct-downstream catalytic converter 41 (position P in FIG. 1), between the direct-downstream catalytic converter 41 and the PM treatment device 46 (position Q in FIG. 1), and a downstream side from the PM treatment device 46 (position R in FIG. 1). In the following explanation, the exhaust gas sensor 21 is explained as being provided between the direct-downstream catalytic converter 41 and PM treatment device 46, as shown in FIG. 1. It should be noted that, in the case of providing the exhaust gas sensor 21 on the downstream side from the PM treatment device 46, qualitatively different effects will be exerted compared to a case of providing on an upstream side from the PM treatment device 461; however, this point will be explained while referencing FIGS. 7 to 9 later.

The NOx sensor 22 detects the NOx concentration in the exhaust gas on the downstream side from the under-floor catalytic converter 42, and sends a signal substantially proportional to the detection value to the ECU 3. The exhaust temperature sensor 23 detects the exhaust gas temperature inside of the exhaust channel 11, and sends a signal substantially proportional to the detection value to the ECU 3. The crank angle position sensor 14 detects the rotational angle of the crank shaft of the engine 1, as well as sending a pulse signal every predetermined crank angle to the ECU 3. In the ECU 3, the revolution speed of the engine 1 is calculated based on this pulse signal. The accelerator aperture sensor 15 detects a depression amount of the accelerator pedal, which is not illustrates, and sends a signal substantially proportional to the detection value to the ECU 3. In the ECU 3, a driver demanded driving power is calculated based on the detection signals from the crank angle position sensor 14 and accelerator aperture sensor 15. The air flow sensor 16 detects a flow rate of fresh air flowing through the intake channel 11, i.e. fresh air amount supplied into the cylinders of the engine 1, and sends a signal substantially proportional to the detection value to the ECU 3.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU in order to execute the air/fuel ratio control described later, calculation results, and the like, and an output circuit that outputs control signals to the fuel injectors of the engine 1, urea water injector 432, EGR control valve 52, and the like.

Hereinafter, a sequence of air/fuel ratio control by the ECU will be explained while referencing FIG. 3.

Figure 3:
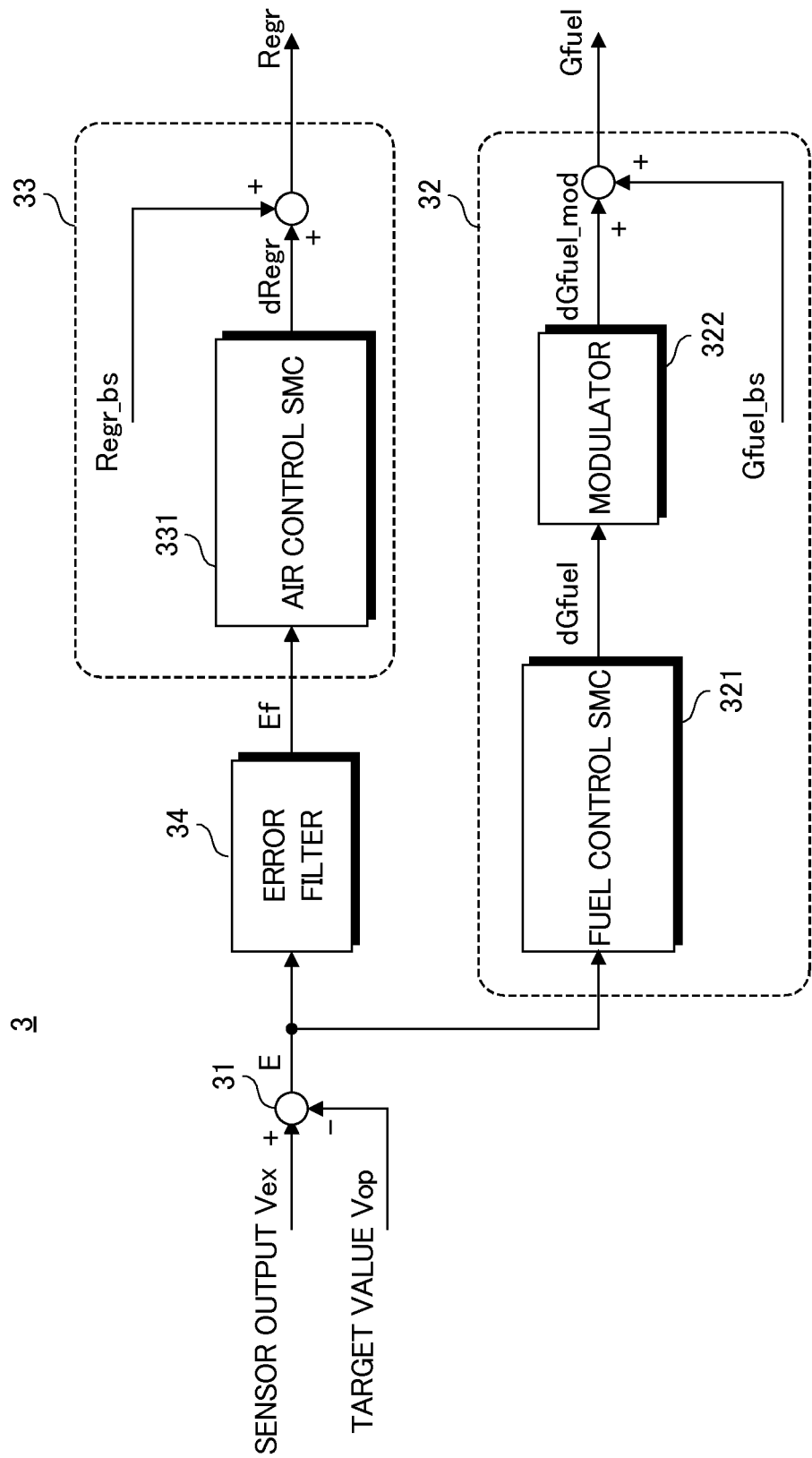
FIG. 3 is a block diagram showing the configuration of an ECU as an air/fuel ratio control device.

FIG. 3 is a block diagram showing the configuration of the ECU 3 as the air/fuel ratio control device.

The ECU 3 includes an error calculation unit 31 that calculates an error E of the output value Vex (A/F) of the exhaust gas sensor relative to a target value Vop (A/F), a fuel controller 32 that adjusts the fuel injection amount Gfuel (mg/s) based on the error E, and an air controller 33 that adjusts an EGR rate Regr (%) (or EGR gas amount (mg/s)) based on the error E, and controls the exhaust gas sensor output Vex to this target value Vop by adjusting the fuel injection amount Gfuel and EGR rate Regr.

The error calculation unit 31 calculates the error E by subtracting the target value Vop from the exhaust gas sensor output Vex (refer to following formula (1)). It should be noted that the symbol "k" in the formula shown below is a symbol indicating the control time, which is updated at a predetermined synchronous period (e.g., TDC synchronization period, 20 (msec) period, etc.).

$$E(k)=Vex(k)-Vop(k) \quad (1)$$

In the above formula (1), the target value Vop relative to the exhaust gas sensor output Vex is set to value according to the operating mode of the engine at this time.

As explained while referencing FIG. 2, the oxidation efficiency for HC and CO by the direct-downstream catalytic converter rises as the exhaust gas air/fuel ratio is set to leaner. In addition, when the exhaust gas air/fuel ratio is set to leaner than stoich, the purification of NOx by the under-floor catalytic converter becomes possible. Therefore, in the lean operation mode, the target value Vop relative to the exhaust gas sensor output Vex is set to a value such that the direct-downstream catalytic converter and under-floor catalytic converter become lean atmospheres, in order to allow HC and CO oxidation to be assumed by the direct-downstream catalytic converter and NOx reduction to be assumed by the under-floor catalytic converter.

In addition, as explained while referencing FIG. 2, when maintaining the air/fuel ratio of exhaust gas within the three-way purification window, it is possible to purify HC, CO and NOx by the direct-downstream catalytic converter with high efficiency. Therefore, the stoich operation mode sets the target value Vop relative to the exhaust gas sensor output Vex to a value such that the purification reactions of HC, CO and NOx (three-way purification reaction) in the direct-downstream catalytic converter and PM treatment device are optimized.

Figure 4:
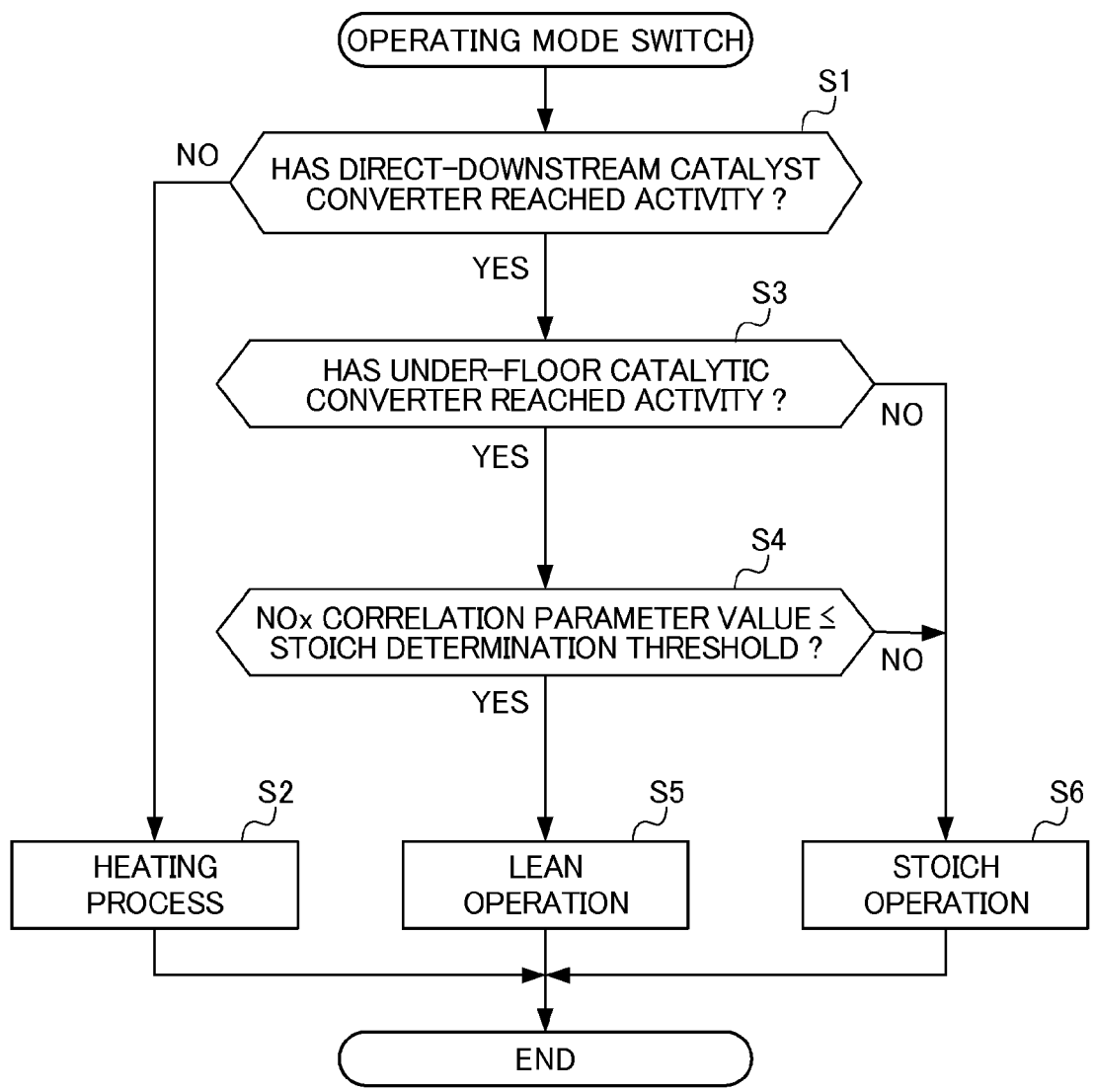
FIG. 4 is a flowchart showing a sequence of switching operating modes of the engine.

FIG. 4 is a flowchart showing a sequence of switching operating modes of the engine. This processing is repeatedly executed from immediately after engine startup at a predetermined control period.

In Step S1, it is determined whether the direct-downstream catalytic converter has reached activation thereof. More specifically, for example, the estimated temperature of the direct-downstream catalytic converter calculated based on the output of the exhaust temperature sensor and the activation temperature of the direct-downstream catalytic converter are compared, it is determined as having reached activation in the case of the estimated temperature being at least the activation temperature, and it is determined as not having reached activation in the case of the estimated temperature being lower than the activation temperature. In the case of the determination in S1 being NO, the processing advances to S2, and a heating process of the direct-downstream catalytic converter is executed. In the case of the determination in S1 being YES, the processing advances to S3.

In S3, it is determined whether the under-floor catalytic converter has reached activation thereof. More specifically, for example, the estimated temperature of the under-floor catalytic converter calculated based on the output of the exhaust temperature sensor and the activation temperature of the under-floor catalytic converter are compared, it is determined as having reached activation in the case of the estimated temperature being at least the activation temperature, and it is determined as not having reached activation in the case of the estimated temperature being lower than the activation temperature. In the case of the determination in S3 being YES and the under-floor catalytic converter reaching activation, the processing advances to S4.

In S4, the value of a NOx correlation parameter which increases depending on the NOx amount discharged from the engine is calculated, and it is determined whether this value is no more than a stoich judgment threshold value. As this NOx correlation parameter, a demanded torque of the engine can be used, for example. As another NOx correlation parameter, a parameter that increases proportionally to the NOx emission amount from the engine can be used, such as an indicated mean effective pressure calculated from the output of a cylinder internal pressure sensor that is not illustrated, and an estimated value of the NOx emission amount.

In the case of the determinations in S3 and S4 both being YES, i.e. in the case of the under-floor catalytic converter reaching activation and the NOx amount discharged from the engine being relatively small, i.e. in a case of the NOx purification performance of the overall exhaust purification system being sufficient even when not switching the operating mode from lean operation to stoich operation, the operating mode is set to lean operation (S5). Herein, NOx purification performance of the overall exhaust purification system refers to the combined NOx purification performance of the direct-downstream catalytic converter, PM treatment device and under-floor catalytic converter.

In the case of either among the determinations in S3 and S4 being NO, i.e. in the case of the under-floor catalytic converter not reaching activation, or the NOx amount discharged from the engine being relatively large, i.e. in the case of setting the operating mode to stoich operation being able to improve the NOx purification performance of the overall exhaust purification system more than lean operation, the operating mode is set to stoich operation (S6). In the case of the under-floor catalytic converter not reaching activation, setting the operating mode to stoich operation and purifying NOx employing the three-way purification reaction on the direction-downstream catalytic converter can remarkably improve the NOx purification performance of the overall exhaust purification system. In addition, even when the under-floor catalytic converter has reached activity, in the case of the NOx amount discharged from the engine being large, purifying NOx employing the three-way purification reaction on the direct-downstream catalytic converter having high NOx purification performance can remarkably improve the NOx purification performance of the overall exhaust purification system. As above, by setting the operating mode to stoich operation only under operating conditions that can remarkably improve the NOx purification performance of the overall exhaust purification system, it is possible to prevent degradation in the fuel consumption, while maintaining the NOx purification performance of the overall exhaust purification system to be high.

Referring back to FIG. 3, the error E calculated by the error calculation unit 31 is inputted to the fuel controller 32 and air controller 33. However, the EGR rate Regr cannot compensate for the air/fuel ratio error of high frequency or of a spike, due to being accompanied with a response lag and dead time. From this fact, a filtering error Ef obtained by conducting filtering processing by an error filter 34 on the error E is inputted to the air controller 33 in order to set the air/fuel ratio error to compensate for EGR rate Regr to a value that is low frequency and not a spike.

The error filter 34 conducts $\epsilon$ filter processing shown in the following formulas (2-1) and (2-2) on the error E, and outputs a filtering error Ef. In the following formulas (2-1) and (2-2), n is a positive integer and corresponds to a moving average tap number, and $\epsilon e$ is a positive real number and corresponds to a filter threshold.

$$Em(k-i) = \begin{cases} E(k-i) & (-\varepsilon e < E(k-i) < \varepsilon e) \\ E(k) & (E(k-i) \le -\varepsilon e, E(k) \le \varepsilon e) \end{cases} \quad (2\text{-}1)$$

$$(i = 1 \ldots n)$$

$$EF(k) = \frac{1}{n+1} \sum_{i=0}^{n} Em(k-i) \quad (2\text{-}2)$$

The air controller 33 determines the EGR rate Regr for controlling the exhaust gas sensor output Vex so as to converge to the target value Vop, by totaling a predetermined reference EGR rate Regr_bs, and an EGR rate correction amount dRegr calculated by an air control sliding mode controller (hereinafter referred to as "air control SMC") 331 (refer to following formula (3)).

$$Regr(k) = Regr\_bs(k) + dRegr(k) \quad (3)$$

The reference EGR rate Regr_bs is a reference value for realizing an air/fuel ratio of the air/fuel mixture set as the target in each operating mode, and is calculated according to a predetermined algorithm or by searching a map establish in advance, based on the type of operating mode of the engine at this time (lean operation of stoich operation), and the operating state of the engine characterized by the engine revolution speed, vehicle speed, fuel injection amount, etc. In other words, the reference EGR rate Regr_bs is set to a value such that a state is realized in which the air/fuel ratio of the air/fuel mixture is on a leaner side from stoich if during lean operation, and to a value such that a state is realized in which the air/fuel ratio of the air/fuel mixture is stoich or in the vicinity thereof if during stoich operation.

The air control SMC 331 calculates the EGR rate correction amount dRegr relative to the reference EGR rate Regr_bs, based on an already known feedback control algorithm, with the filtering error Ef as an input. As a feedback control algorithm that calculates the EGR rate correction amount dRegr based on the error Ef, for example, a sliding mode algorithm explained while referencing formulas (4-1) to (4-4) below can be used.

The air control SMC 331 calculates the sum of the product of a predetermined air control switching function setting parameter Sa(−1<Sa<0) and the error Ef(k−1) during a previous control, and the error Ef(k) during current control, and defines this as a switching function σa(k) (refer to formula (4-1)).

Next, the air control SMC 331 calculates a reaching-law input Urch_a(k) by multiplying a predetermined feedback factor Krch_a by the switching function σa(k) (refer to formula (4-2)), calculates an adaptive-law input Uadp_a(k) by calculating a summation of values arrived at by multiplying a predetermined feedback factor Kadp_a by the switching function σa(k) (refer to formula (4-3)), and defines the sum of these inputs Urch_a(k) and Uadp_a(k) as the EGR rate correction amount dRegr(k) (refer to formula (4-4)).

$$\sigma a(k) = Ef(k) + Sa\, Ef(k-1) \quad (4\text{-}1)$$

$$Urch\_a(k) = Krch\_a\, \sigma a(k) \quad (4\text{-}2)$$

$$Uadp\_a(k) = \sum_{i=0}^{k} Kadp\_a\, \sigma a(i) \quad (4\text{-}3)$$

$$dRegr(k) = Urch\_a(k) + Uadp\_a(k) \quad (4\text{-}4)$$

The fuel controller 32 determines the fuel injection amount Gfuel for controlling the exhaust gas sensor output Vex so as to converge to the target value Vop by totaling a predetermined reference fuel injection amount Gfuel_bs, and the fuel correction amount dGfuel calculated by a fuel control sliding mode controller (hereinafter referred to as "fuel control SMC") 321 or a modulated correction amount dGfuel_umod arrived at by a modulator 322 modulating this fuel correction amount dGfuel. It should be noted that, in the case of providing the exhaust gas sensor on the downstream side of the PM treatment device, it is not necessarily required to provide the modulator 322, as explained in detail while referencing FIGS. 7 and 8 later.

More specifically, the fuel controller 32 defines the value totaling the reference fuel injection amount Gfuel_bs and the modulated correction amount dGfuel_mod obtained by modulating by way of the modulator 322 as the fuel injection amount Gfuel in the case of being in stoich operation and being a state in which the PM collected in the PM treatment device is oxidizable, and in other cases, sets a value arrived at by totaling the reference fuel injection amount Gfuel_bs and the fuel correction amount dGfuel obtained by the fuel control SMC 321 as the fuel injection amount Gfuel (refer to formula (5)). Herein, whether being a PM oxidizable state is determined by comparing the temperature of the PM treatment device estimated based on the output of the temperature sensor with a predetermined PM combustion temperature. In addition, this PM combustion temperature is on the order of 300° C., for example, in the case of additive not being supplied to the fuel as described above, and is on the order of 150° C., for example, in the case of additive being supplied to the fuel.

$$Gfuel(k) = \begin{cases} Gfuel\_bs(k) + dGfuel\_mod(k) & \ldots \text{(During Stoich Operation and PM Oxidizable)} \\ Gfuel\_bs(k) + dGfuel(k) & \ldots \text{(Other Cases)} \end{cases} \quad (5)$$

The reference fuel injection amount Gfuel_bs is a reference value for realizing the air/fuel ratio of the air/fuel mixture set as the target in each operating mode, and is calculated according to a predetermined algorithm or by searching a map established in advance, based on the type of operating mode of the engine at this time (lean operation or stoich operation), and the operating state of the engine characterized by the engine revolution speed, vehicle speed, fuel injection amount, etc. In other words, the reference fuel injection amount Gfuel_bs is set to a value such that a state is realized in which the air/fuel ratio of the air/fuel mixture is on a leaner side from stoich if during lean operation, and to a value such that a state is realized in which the air/fuel ratio of the air/fuel mixture is stoich or in the vicinity thereof if during stoich operation.

The fuel control SMC 321 calculates the fuel correction amount dGfuel relative to the reference fuel injection amount Gfuel_bs so that the exhaust gas sensor output Vex converges to the target value Vop, based on a predetermined feedback control algorithm with the error E as an input. As an algorithm to calculate the fuel correction amount dGfuel based on the error E, for example, the sliding mode algorithm explained while referencing the following formulas (6-1) to (6-4) can be used.

The fuel control SMC 321 calculates the sum of the product of a predetermined fuel control switching function setting parameter Sf(−1<Sf<0) and the error E(k−1) during a previous control, and the error E(k) during current control, and defines this as a switching function σf(k) (refer to formula (6-1)).

Next, the fuel control SMC 321 calculates a reaching-law input Urch_f(k) by multiplying a predetermined feedback factor Krch_f by the switching function σf(k) (refer to formula (6-2)), calculates an adaptive-law input Uadp_f(k) by calculating a summation of values arrived at by multiplying a predetermined feedback factor Kadp_f by the switching function σf(k) (refer to formula (6-3)), and defines the sum of these inputs Urch_f(k) and Uadp_f(k) as the fuel correction amount dGfuel(k) (refer to formula (6-4)).

$$\sigma f(k) = E(k) + Sf\, E(k-1) \quad (6\text{-}1)$$

$$\text{Urch\_f}(k) = \text{Krch\_f}\,\sigma f(k) \quad (6\text{-}2)$$

$$\text{Uadp\_f}(k) = \sum_{i=0}^{k} \text{Kadp\_f}\,\sigma f(i) \quad (6\text{-}3)$$

$$dGfuel(k) = \text{Urch\_f}(k) + \text{Uadp\_f}(k) \quad (6\text{-}4)$$

In the above way, the fuel control SMC 321 and air control SMC 331 calculate correction amounts dGfuel, dRegr so that the respective errors E (including the filter value Ef thereof) become 0. Herein, since it is configured so as to cause the output Vex of the exhaust gas sensor to converge to the target value Vop with high precision, while avoiding interference between these two controllers 321, 331, the convergence rate of the exhaust gas sensor output Vex to the target value Vop by way of the fuel control SMC 321 is preferably set so as to be faster than the convergence rate of the exhaust gas sensor output Vex to the target value Vop by way of the air control SMC 331. This is realized by setting the fuel control switching function setting parameter Sf to a value larger than the air control switching function setting parameter Sa, as shown in the following formula (7).

$$-1 < Sa < Sf < 0 \quad (7)$$

The modulator 322 determines the fuel injection amount Gfuel so that the air/fuel ratio of the air/fuel mixture during stoich operation becomes leaner than a predetermined period stoich, by calculating the modulated correction amount dGfuel_mod with the fuel correction amount dGfuel relative to the reference fuel injection amount Gfuel_bs determined according to the operating mode as an input, and adopting an already known modulation algorithm to this input (refer to above formula (5)). Herein, as the modulation algorithm adopted, for example, a ΔΣ modulation algorithm explained while referencing formulas (8-1) to (8-3) is adopted, for example.

The modulator 322 defines a value arrived at by subtracting a modulated correction amount dGfuel_mod(k−1), which is a previous output, from a fuel correction amount dGfuel(k), which is a current input, as deviation δm(k) (refer to formula (8-1)).

Next, the modulator 322 calculates a deviation integrated value δm(k) by totaling the current deviation δm(k) and the deviation integrated value δm(k−1) during a previous control (refer to formula (8-2)).

Then, the modulator 322 defines a predetermined positive modulated amplitude value ΔGfuel(ΔGfuel>0) as the modulated correction amount dGfuel_mod in a case of the deviation integrated value δm(k) being at least 0, and outputs a negative modulated amplitude value −ΔGfuel as the modulated correction amount dGfuel_mod in the case of the deviation integrated value δm(k) being less than 0 (refer to formula (8-3)).

$$\delta m(k) = dGfuel(k) - dGfuel\_mod(k-1) \quad (8\text{-}1)$$

$$\delta m(k) = \delta m(k-1) + \delta m(k) \quad (8\text{-}2)$$

$$dGfuel\_mod(k) = \begin{cases} \Delta Gfuel & (\delta m(k) \ge 0) \\ -\Delta Gfuel & (\delta m(k) < 0) \end{cases} \quad (8\text{-}3)$$

It should be noted that the modulated amplitude value ΔGfuel is a fixed value irrespective of the control time in the above formula (8-3); however, it is not limited thereto and may be a variable allowing change every control time. In addition, so as to enable modulation at a suitable period with the fuel correction amount dGfuel as a binary signal by the modulator 322, the variation width of the modulated correction amount dGfuel_mod (2ΔGfuel) is set so as to be larger than the variation width of the fuel correction amount dGfuel. If the variation width of the fuel correction amount dGfuel exceeds the variation width 2ΔGfuel of the modulated correction amount dGfuel_mod, the output signal of the modulator 322 will enter a saturated state, and oscillatory behavior will occur in the modulated correction amount dGfuel_mod.

It should be noted that, in the case of not being able to avoid making the above-mentioned variation width 2ΔGfuel smaller than the variation width of the fuel correction amount dGfuel, it is possible to adopt a partition ΔΣ modulation algorithm proposed by the applicants of the present application, in place of the above such ΔΣ modulation algorithm. With this partition ΔΣ modulation algorithm, the fuel correction amount dGfuel serving as the input to the modulator 322 is divided into the three components dGfuel_c, dGfuel_l, and dGfuel_h (refer to following formula (9)). In the below formula (9), "dGfuel_c" indicates a central value component calculated so as to follow a low frequency component of the fuel correction amount dGfuel, "dGfuel_l" indicates a small change component that is a change within a predetermined range from the central value component dGfuel_c, and "dGfuel_h" indicates a large change component that is a change of at least the above-mentioned predetermined range from the central value component dGfuel_c.

$$dGfuel(k) = dGfuel\_c(k) + dGfuel\_l(k) + dGfuel\_h(k) \quad (9)$$

In addition, in the fuel correction amount dGfuel divided in the above way, a modulation component dGfuel_l_dsm of the small change component is calculated by modulating only the small change component dGfuel_l according to the ΔΣ modulation algorithm shown in the above-mentioned formulas (8-1) to (8-3), and subsequently, a value arrived at by recombining the modulation component dGfuel_l_dsm and the other components dGfuel_c, dGfuel_h as shown in the below formula (10) is defined as the modulated correction amount dGfuel_mod. It is thereby possible to modulate the fuel correction amount dGfuel in a suitable period without allowing oscillatory behavior to occur, even in the case like the variation width of the fuel correction amount dGfuel becoming larger than the variation width of the modulated correction amount dGfuel_mod. It should be noted that since a specific sequence of dividing the input dGfuel as shown in the above formula (9) and calculating the three components dGfuel_c, dGfuel_l and dGfuel_h is disclosed in Japanese Unexamined Patent Application, Publication No. 2005-275489 by the applicants of the present application, a detailed explanation is omitted herein.

$$dGfuel\_mod(k) = dGfuel\_c(k) + dGfuel\_l\_dsm(k) + dGfuel\_h(k) \quad (10)$$

Next, an example of air/fuel ratio control of the present embodiment will be explained while comparing with a conventional example. Herein, the conventional example differs from the present embodiment in the aspect of not modulating the fuel correction amount dGfuel as shown in the above formulas (8-1) to (8-3). In other words, the conventional example corresponds to an example in which the fuel injection amount Gfuel is continuously determined by the bottom formula in the above formula (5).

Figure 5:
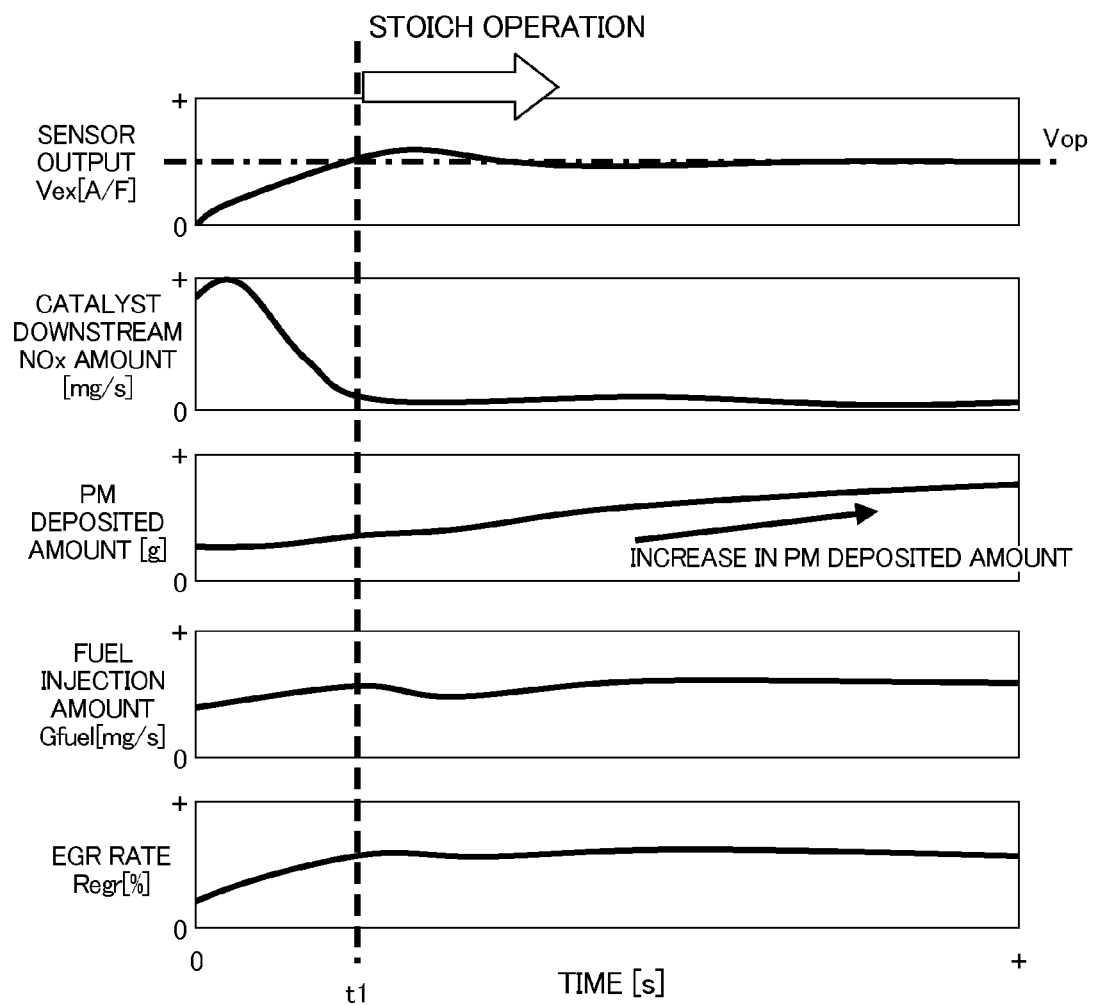
FIG. 5 provides time charts showing a control example of the air/fuel ratio control device for a conventional example.

FIG. 5 provides time charts showing a control example of an air/fuel ratio control device of the conventional example.

When the operating mode switches from lean operation to stoich operation at time t1, the target value Vop relative to the exhaust gas sensor output Vex is set to a value such that the three-way purification reaction in the direct-downstream catalytic converter and PM treatment device are optimized (refer to single-dot dashed line in FIG. 5). The fuel injection amount Gfuel and EGR rate Regr are each set to values so that the exhaust gas sensor output Vex converges to the target value Vop. The CO, HC and NOx in exhaust gas are thereby purified with high efficiency by the direct-downstream catalytic converter.

Figure 11:
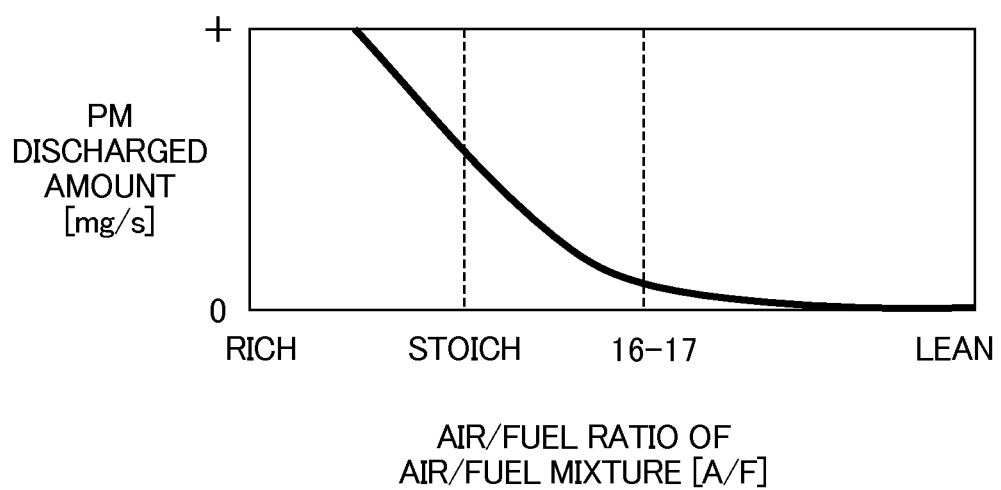
FIG. 11 is a graph showing a relationship between the air/fuel ratio of the air/fuel mixture and the discharged amount of particulate matter.

However, the amount of PM discharged from the engine also increases as explained while referencing FIG. 11, accompanying switching the operating mode from lean operation to stoich operation. At this time, even if a state in which the temperature of the PM treatment device exceeded the PM oxidation temperature, the PM deposited amount in the PM treatment device will rapidly increase compared to during lean operation, without combusting since the PM treatment device is under a stoich atmosphere almost free of oxygen.

Figure 6:
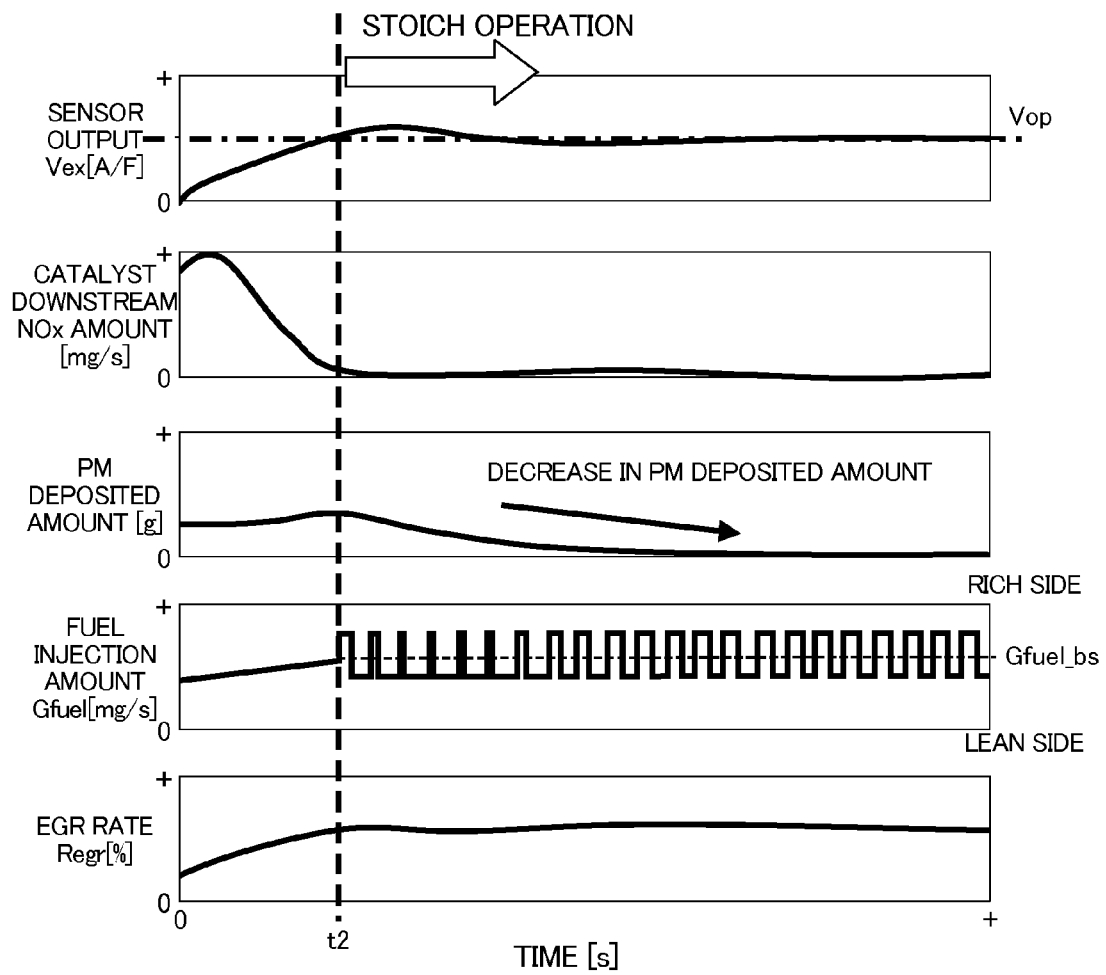
FIG. 6 provides time charts showing a control example of the air/fuel ratio control device for the embodiment.

FIG. 6 provides time charts showing a control example of an air/fuel ratio control device of the present embodiment.

When the operating mode switches from lean operation to stoich operation at time t2, the target value Vop relative to the exhaust gas sensor output Vex is set to a value of stoich or in the vicinity thereof as shown by the single-dot dashed line in FIG. 6, similarly to the above-mentioned conventional example. The fuel injection amount Gfuel and EGR rate Regr each are thereby set to values such that the exhaust gas sensor output Vex converges to the target value Vop.

More specifically, the EGR rate Regr is set to a value such that the exhaust gas sensor output Vex converges to the target value Vop, by way of the air controller. As a result thereof, the EGR rate Regr is maintained at a substantially constant value, as shown in FIG. 6.

The fuel injection amount Gfuel is determined so that a state smaller than the reference fuel injection amount Gfuel_bs determined so as to realize stoich (state in which air/fuel ratio of air/fuel mixture is leaner than stoich) and a larger state (state in which the air/fuel ratio of the air/fuel mixture is richer than stoich) are alternately realized, by adding the modulated correction amount dGfuel_mod obtained by modulating the fuel correction amount dGfuel to the reference fuel injection amount Gfuel_bs. Although the air/fuel ratio of the air/fuel mixture comes to alternately repeat the lean state and rich state in this way, due to the modulated correction amount dGfuel_mod being decided by modulating the fuel correction amount dGfuel determined so that the exhaust gas sensor output Vex converges to the target value Vop, and having a lag characteristic in the exhaust gas flow, the exhaust gas sensor output Vex is maintained at the target value Vop. Therefore, the direct-downstream catalytic converter is maintained as a stoich atmosphere similarly to the conventional example of FIG. 5, and CO, HC and NOx are purified at high efficiency.

On the other hand, the exhaust gas flowing into the direct-downstream catalytic converter intermittently enters a lean state containing oxygen, and thus the PM deposited in the PM treatment device is oxidized. For this reason, although the amount of PM discharged from the engine increases during stoich operation, the PM is continuously oxidized in the PM treatment device; therefore, the PM deposited amount does not increases, and further, can be made to gradually decrease as shown in FIG. 6. With a lean burn engine in particular, stoich operation is performed when the operating state enters high load; however, at this time, since the exhaust gas temperature also rises, the period of performing stoich operation and the period in which the PM oxidation conditions are satisfied match. Therefore, particularly with a lean burn engine, it is possible to remove PM in the PM treatment device efficiently during stoich operation.

Modified Example 1

In the above-mentioned embodiment, a case of adopting a $\Delta\Sigma$ modulation algorithm as shown in formulas (8-1) to (8-3) as the modulation algorithm for modulating the fuel correction amount dGfuel is explained; however, the fuel correction amount dGfuel may be modulated by adopting a PWM modulation algorithm as shown in the below formulas (11-1) to (11-5).

The modulator defines a positive offset value $\lambda in(k)$ by adding a positive modulation amplitude value $\Delta Gfuel$ to a fuel correction amount dGfuel(k), and further calculating a ratio $R\_\lambda(k)$ of this offset value $\lambda in(k)$ to the variation width $2\Delta Gfuel$ of the modulated correction amount dGfuel_mod (refer to formula (11-2)). This ratio $R\_\lambda(k)$ serves as a parameter proportional to the pulse width of a signal generating.

Next, the modulator calculates a ratio $R\_tm(k)$ of a timer variable $TM\_pwm(k)$ (refer to formula (11-3)) defined so as to be updated ever control period $\Delta T$ and reset to 0 every predetermined PWM modulation period PRD_m, and the PWM modulation period PRD_m (refer to formula (11-4)).

Next, the modulator compares between the ratio $R\_tm(k)$ related to time and the ratio $R\_\lambda(k)$ related to pulse width, and in the case of the ratio $R\_tm(k)$ being no more than the ratio $R\_\lambda(k)$, sets the positive modulation amplitude value $\Delta Gfuel$ as the modulated correction amount dGfuel_mod(k), and in the case of the ratio $R\_tm(k)$ being greater than the ratio $R\_\lambda(k)$, sets the negative modulation amplitude value $-\Delta Gfuel$ as the modulated correction amount dGfuel_mod(k) (refer to formula (11-5)).

$$\lambda in(k) = dGfuel(k) + \Delta Gfuel \tag{11-1}$$

$$R\_\lambda(k) = \frac{\lambda in(k)}{2\Delta Gfuel} \tag{11-2}$$

$$TM\_pwm(k) = \begin{cases} TM\_pwm(k-1) + \Delta T & (TM\_pwm(k-1) + \Delta T \leq PRD\_m) \\ 0 & (TM\_pwm(k-1) + \Delta T > PRD\_m) \end{cases} \tag{11-3}$$

$$R\_tm(k) = \frac{TM\_pwm(k)}{PRD\_m} \tag{11-4}$$

$$dGfuel\_mod(k) = \begin{cases} \Delta Gfuel & (R\_tm(k) \leq R\_\lambda(k)) \\ -\Delta Gfuel & (R\_tm(k) > R\_\lambda(k)) \end{cases} \tag{11-5}$$

It should be noted that, in the case of not being able to avoid making the above-mentioned variation width $2\Delta Gfuel$ smaller than the variation width of the fuel correction amount dGfuel, it is possible to adopt a partition PWM modulation algorithm proposed by the applicants of the present application, in place of the above such PWM modulation algorithm. This partition PWM modulation algorithm divides the fuel correction amount dGfuel serving as the input to the modulator into three components, as explained while referencing the above formulas (9) and (10), and modulates only one component thereamong. Since a detailed sequence of this partition PWM modulation algorithm is disclosed in Japanese Unexamined Patent Application, Publication No. 2007-79829 by the applicants of the present application, a detailed explanation is omitted herein.

Modified Example 2

Although cases of the modulation amplitude value ΔGfuel being a fixed value are explained in the above-mentioned embodiment and Modified Example 1 thereof, the present invention is not limited thereto, and it is possible to set the modulation amplitude value ΔGfuel to different variable values for every control time.

With the present invention as described above, the air/fuel ratio of the air/fuel mixture is intermittently set to a lean state, while maintaining the direct-downstream catalytic converter as a stoich atmosphere, by modulating the fuel correction amount dGfuel by the modulation amplitude value ΔGfuel. In this case, the modulation amplitude value ΔGfuel becomes a value proportional to the amplitude centered around stoich of the air/fuel ratio of the air/fuel mixture. In addition, since it is preferable to supply as much oxygen as possible in order to promote oxidation of PM in the PM treatment device, it is preferable for the modulation amplitude value ΔGfuel to be a larger value from the viewpoint of PM oxidation promotion. However, as explained while referencing FIG. 2, the NOx purification performance of the direct-downstream catalytic converter remarkably declines when the air/fuel ratio of the exhaust gas shifts from the three-way purification window to the lean side; therefore, there is a limit to the shift amount to the lean side, i.e. the size of the modulation amplitude value ΔGfuel.

Therefore, so as not to be extremely leaned out during modulation, in the present modified example, the modulation amplitude value ΔGfuel(k) is made to change in order to provide a restriction to the variation width centered around stoich of the air/fuel ratio of the air/fuel mixture. More specifically, in the case of defining the fresh air amount introduced into the cylinders as Gfsh(k), defining αst as the stoich air/fuel ratio (e.g., 14.6 (A/F)), and defining αw as the permissible air/fuel ratio variation width, the modulation amplitude value ΔGfuel(k) is determined so that the below formula (12) is satisfied.

$$\alpha st + \alpha w \leq \frac{Gfsh(k)}{Gfuel\_bs(k) + \Delta Gfuel(k)} \quad (12)$$

As shown in FIG. 2, when causing the air/fuel ratio of the exhaust gas to shift by about 0.3 (A/F) from stoich to the lean side, the NOx purification performance of the direct-downstream catalytic converter declines remarkably. Therefore, based on this data of FIG. 2, it is appropriate for the permitted air/fuel ratio variation width αw in the above formula (12) to be set to about 0.3 (A/F) so that the variation width from stoich to the lean side of the air/fuel ratio of the air/fuel mixture during modulation is within 0.3 (A/F).

A case is explained above in which the modulated amplitude value ΔGfuel(k), which is the output of the modulator, was limited so as to be no more than 0.3 (A/F) by conversion to the air/fuel ratio of the air/fuel mixture, so that the efficiency of the three-way purification reaction in the direct-downstream catalytic converter does not decline; however, the present invention is not limited thereto. For example, upon limiting the variation width of the fuel correction amount dGfuel(k), which is an input to the modulator, so as to be no more than 0.3 (A/F) by conversion to the air/fuel ratio of the air/fuel mixture as in the above formula (12), the modulated amplitude value ΔGfuel(k) can exert substantially the same effect by setting to a somewhat greater value than 0.3 (A/F) by conversion to the air/fuel ratio of the air/fuel mixture.

It should be noted that, in the above formula (12), although a limiting formula for the air/fuel ratio variation width is derived when centered around the stoich air/fuel ratio αst, the present invention is not limited thereto. For example, in a case of centering around the stoich air/fuel ratio Gfsh(k)/(Gfuel_bs(k)+dGfuel(k)) derived based on the exhaust gas sensor output, the modulated amplitude value ΔGfuel(k) is established so that the below formula (13) is satisfied (refer to FIG. 9 described later).

$$\alpha w \geq \left| \frac{Gfsh(k)}{Gfuel\_bs(k) + dGfuel(k)} - \frac{Gfsh(k)}{Gfuel\_bs(k) + \Delta Gfuel(k)} \right| \quad (13)$$

Regarding Position at which Exhaust Gas Sensor 21 is Provided

Hereinafter, the position at which the exhaust gas sensor 21 is provided will be explained while referencing FIGS. 7 to 9. As shown in FIG. 1, the exhaust gas sensor 21 may be provided at any of the three positions of a position P on an upstream side from the direct-downstream catalytic converter 41, a position Q between the direct-downstream catalytic converter 41 and the PM treatment device 46, and a position R on a downstream side from the PM treatment device 46. However, when PM deposits on the PM treatment device 46, and further, this PM oxidizes during stoich operation, the oxygen concentration on the downstream side thereof changes, which influences the output of the exhaust gas sensor. Hereinafter, the relationship between the position at which the exhaust gas sensor is provided and PM oxidation will be verified.

Figure 7:
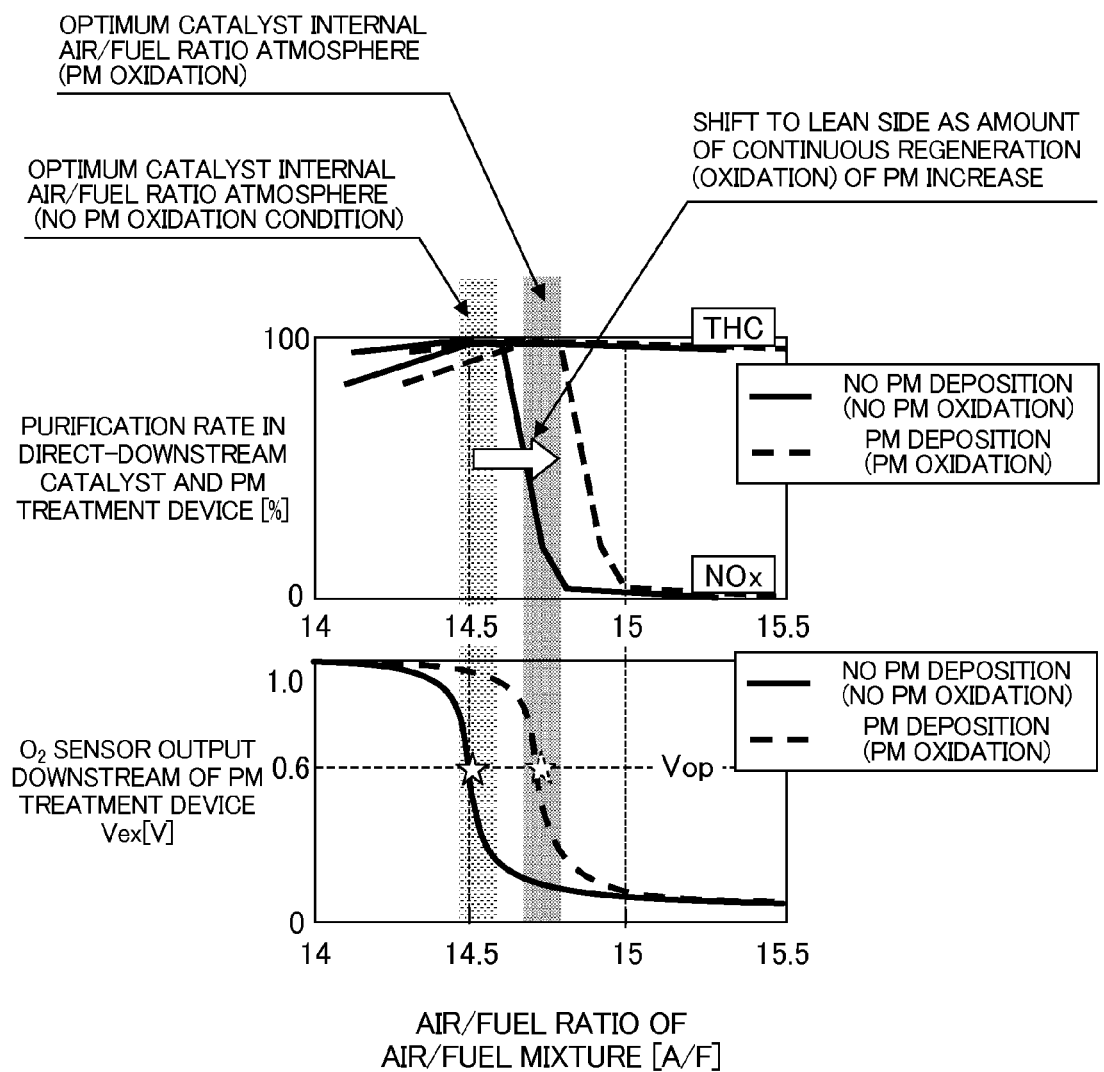
FIG. 7 provides graphs for a case of using an $O_2$ sensor as the exhaust gas sensor and providing this on the downstream side of the PM treatment device, showing a relationship between the air/fuel ratio of the air/fuel mixture, and the purification rate of the exhaust gas components at this time and exhaust gas sensor output.

FIG. 7 provides graphs showing a relationship between the air/fuel ratio of the air/fuel mixture, and the purification rate of the exhaust gas components (NOx, THC) and exhaust gas sensor output at this time. In FIG. 7, the top graph shows the purification rate of the exhaust gas components by the entirety combining the PM treatment device and the direct-downstream catalytic converter including the three-way purification catalyst, respectively. In FIG. 7, the bottom graph shows the output of the exhaust gas sensor, where the exhaust gas sensor is established as an $O_2$ sensor, in the case of providing this exhaust gas sensor downstream of the PM treatment device (position R in FIG. 1). In addition, in FIG. 7, the solid line shows a case of PM not depositing in the PM treatment device and thus oxidation thereof not being able to advance, and the dotted line shows a case of PM depositing in the PM treatment device and oxidation thereof advancing.

As shown by the solid line in the top graph of FIG. 7, in the case of PM not depositing, when the air/fuel ratio of the air/fuel mixture has become a predetermined stoich air/fuel ratio (about 14.5 (A/F) in the example shown in FIG. 7) or in the vicinity thereof, the air/fuel ratio atmosphere is optimized in the direct-downstream catalytic converter and PM treatment device, and thus NOx and THC in the exhaust gas are both purified at high efficiency. At this time, the air/fuel ratio of the air/fuel mixture and the $O_2$ sensor output are associated as shown by the solid line in the bottom graph of FIG. 7. It should be noted that, in the example shown in FIG. 8, the air/fuel ratio of the air/fuel mixture at which the three-way purification reaction in the three-way purification catalyst provided on the upstream side from the $O_2$ sensor is optimized is about 14.5 (A/F), and the $O_2$ sensor output at this time comes to indicate about 0.6 V. Therefore, in the case of the example shown in FIG. 7, by setting the target value Vop to about 0.6 V and performing feedback control so that the $O_2$ sensor output Vex converges to this target value Vop, if a case in which PM is not depositing at least in the PM treatment device, the three-way purification reaction by the overall three-way purification catalyst provided on an upstream side from the $O_2$ sensor will be optimized.

If PM is depositing inside of the PM treatment device and this PM oxidized, the purification curve from the overall three-way purification catalyst provided on an upstream side from the $O_2$ sensor will shift entirely to the lean side as shown by the dotted line in the top graph of FIG. 7. In other words, in a case of PM inside of the PM treatment device being oxidized continuously, depending on the extent of consumption of oxygen by oxidation at this time, the air/fuel ratio of the air/fuel mixture at which the three-way purification reaction in the three-way purification catalyst on an upstream side from the $O_2$ sensor is optimized shifts from a value during non-oxidation (for example, about 14.5 (A/F) as shown in FIG. 7) to a value on the lean side (for example, about 14.7 (A/F) as shown in FIG. 7). This is because, in order to continuously oxidize PM in the PM treatment device, in addition to the amount required in the oxidation of HC and CO in the exhaust gas, excessive oxygen is required.

On the other hand, when PM oxidizes on an upstream side from the $O_2$ sensor, since the oxygen concentration of the exhaust gas around the $O_2$ sensor will decline by this amount, the output Vex of the $O_2$ sensor shifts to the rich side (upper graph in FIG. 7) as shown by the dotted line in the bottom graph in FIG. 7. For this reason, the $O_2$ sensor output when the air/fuel ratio atmosphere of the three-way purification catalyst on an upstream side from the $O_2$ sensor comes to indicate a constant value irrespective of the extent of advance of PM oxidation on the upstream side from the $O_2$ sensor. In other words, this means that, in a case of providing the $O_2$ sensor on a downstream side from the PM treatment device, by performing feedback control such as to converge the exhaust gas sensor output Vex to the target value thereof. Vop during stoich operation, the air/fuel ratio of the air/fuel mixture will automatically become leaner than a predetermined period stoich so that PM on the upstream side from the $O_2$ sensor will be oxidized even without performing modulation operation on the aforementioned such fuel injection amount. Therefore, in the case of providing the $O_2$ sensor on a downstream side from the PM treatment device, the modulation operation of the fuel correction amount dGfuel by the modulator 322 of FIG. 3 is no longer essential. However, with only the feedback of the $O_2$ sensor provided on the downstream side from the PM treatment device, the leaning out of the air/fuel ratio of the air/fuel mixture is not sufficient, and the oxidation of PM during stoich operation may become insufficient. In such a case, since the exhaust gas sensor is provided on the downstream side from the PM treatment device, it may be configured so as to lean out the air/fuel ratio of the air/fuel mixture intentionally, by further adding a modulation operation by the modulator 322.

Figure 8:
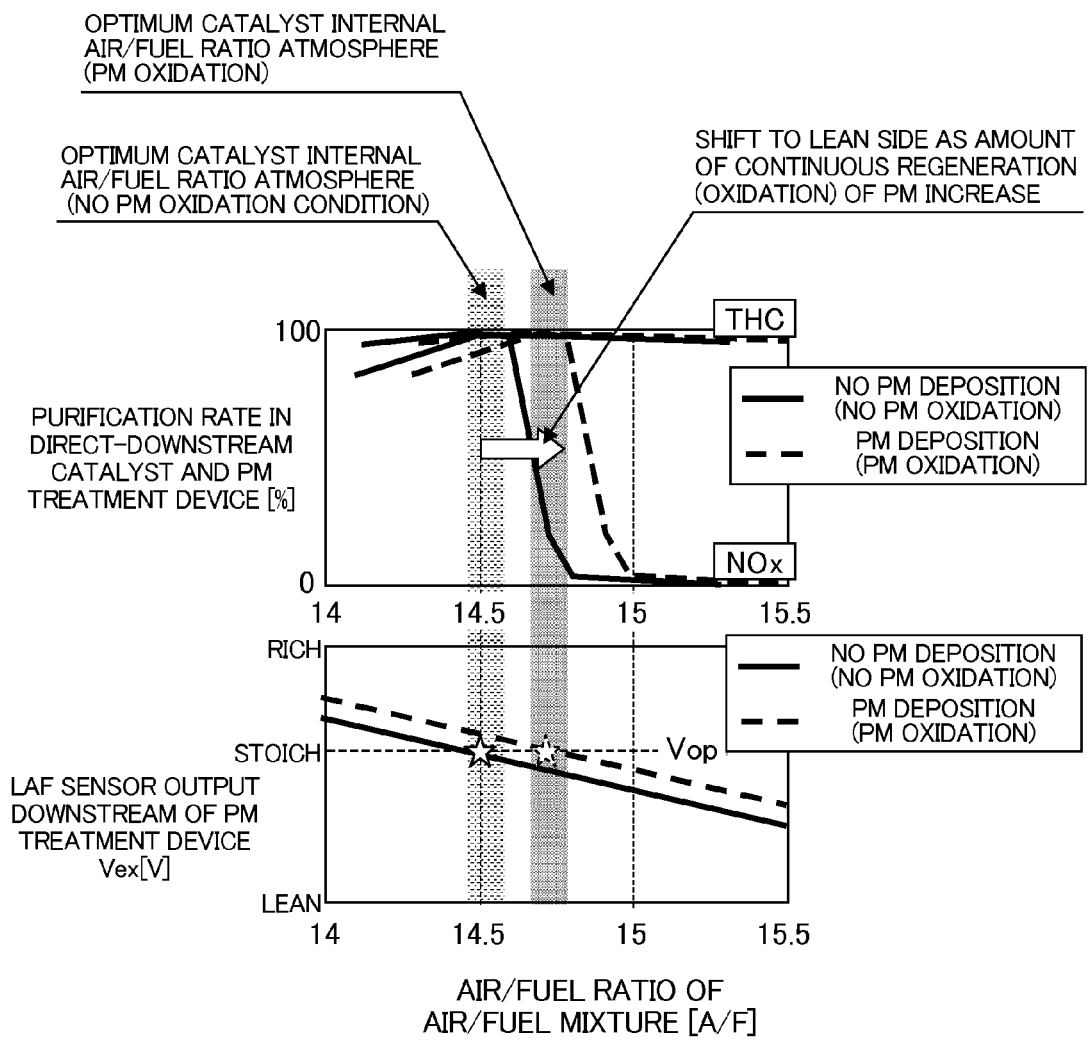
FIG. 8 provides graphs for a case of using an LAF sensor as the exhaust gas sensor and providing this on the downstream side of the PM treatment device, showing a relationship between the air/fuel ratio of the air/fuel mixture, and the purification rate of the exhaust gas components and exhaust gas sensor output at this time.

FIG. 8 provides graphs for a case of using an LAF sensor as the exhaust gas sensor and providing this on the downstream side (position R in FIG. 1) of the PM treatment device, showing a relationship between the air/fuel ratio of the air/fuel mixture, and the purification rate of the exhaust gas components (NOx, THC) and exhaust gas sensor output at this time.

The output of the LAF sensor differs from the $O_2$ sensor, and is influenced by unburnt gas such as HC and CO. For this reason, as shown in FIG. 8, the output Vex of the LAF sensor shifts to the rich side (upwards in FIG. 8) as shown by the dotted line in the bottom graph of FIG. 8. For this reason, the LAF sensor output when the air/fuel ratio of the exhaust gas of the three-way catalyst on an upstream side from the LAF sensor is optimized comes to indicate a constant value irrespective of the extent of advance of PM oxidation on the upstream side from the LAF sensor. Therefore, in a case of using an LAF sensor as the exhaust gas sensor, similarly to a case of using the $O_2$ sensor, by performing feedback control so as to converge the exhaust gas sensor output Vex to the target value thereof. Vop during stoich operation, it is possible to make the air/fuel ratio of the air/fuel mixture leaner than a predetermined period stoich automatically. However, the LAF sensor output has low detection resolution in the vicinity of stoich, as is evident from comparing FIGS. 7 and 8. For this reason, the $O_2$ sensor is considered to be more suited as the exhaust gas sensor provided to the downstream side of the PM treatment device than the LAF sensor.

Figure 9:
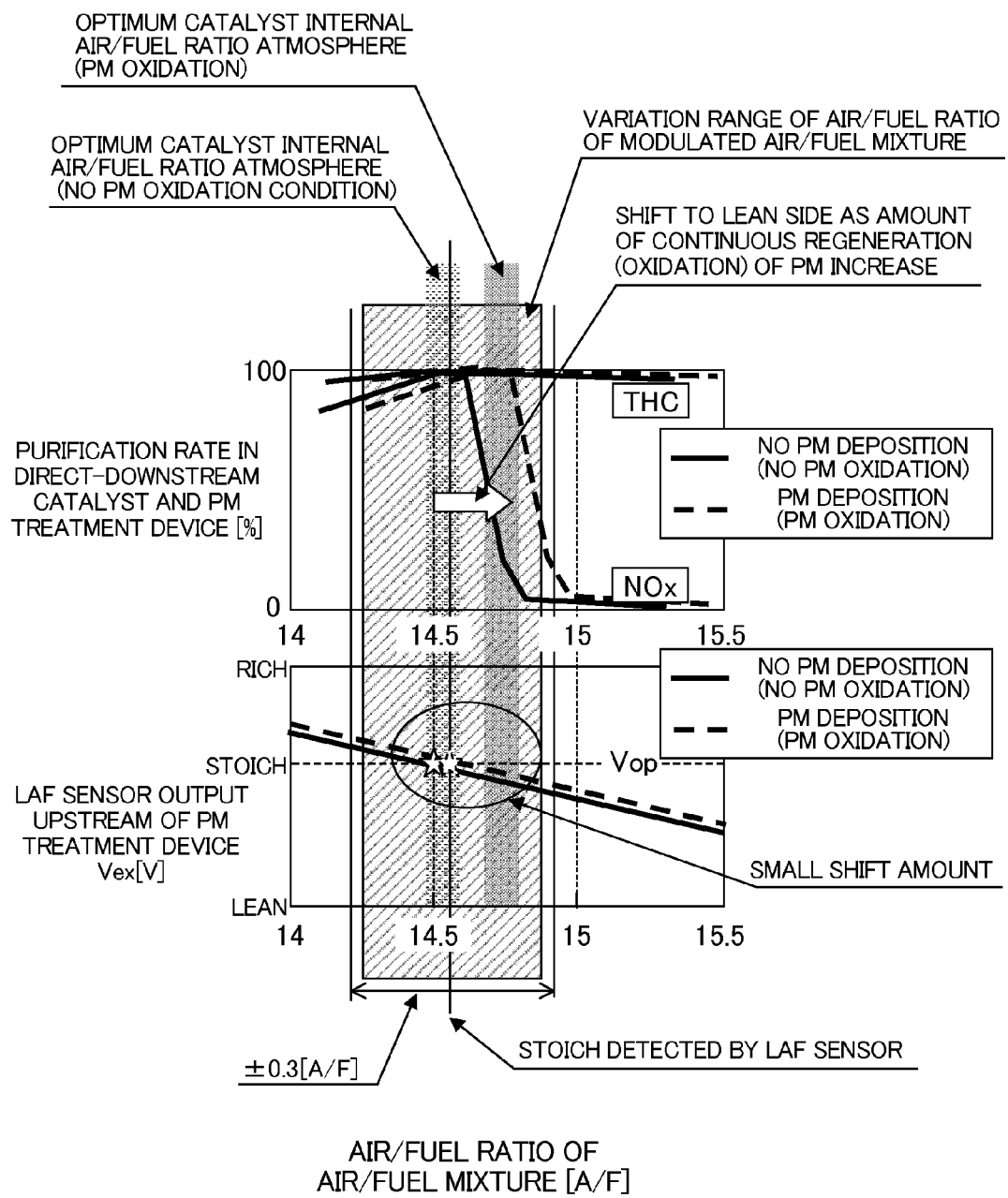
FIG. 9 provides graphs for a case of using an LAF sensor as the exhaust gas sensor and providing this on the upstream side of the PM treatment device, showing a relationship between the air/fuel ratio of the air/fuel mixture, and the purification rate of the exhaust gas components and exhaust gas sensor output at this time.

FIG. 9 provides graphs for a case of using an LAF sensor as the exhaust gas sensor and providing this on the upstream side (position Q in FIG. 1) of the PM treatment device, showing a relationship between the air/fuel ratio of the air/fuel mixture, and the purification rate of the exhaust gas components (NOx, THC) and exhaust gas sensor output at this time.

In the case of providing the LAF sensor to the upstream side of the PM treatment device, the LAF sensor will not be influenced by PM oxidation in the PM treatment device. However, since the exhaust gas temperature during stoich operation reaches high temperatures, PM oxidation will advance not only inside of the PM treatment device, but also in the direct-downstream catalytic converter, and passages until reaching the direct-downstream catalytic converter. In particular, in the case of an additive being included in the fuel, the PM oxidation reaction becomes remarkable. For this reason, also in the case of providing the LAF sensor to the upstream side of the PM treatment device, the output of the LAF sensor shows qualitatively the same behavior as the case of providing on the downstream side of the PM treatment device (refer to FIG. 8) depending on the presence/absence of PM oxidation. However, in the case of providing the LAF sensor on the upstream side of the PM treatment device, since the oxidized amount of PM will decrease on the upstream side from the sensor compared to the case of providing on the downstream side, the shift amount of the LAF sensor output Vex to the lean side during PM oxidation will decrease as shown by the dotted line in the bottom graph in FIG. 9, and the leaning out effect will also decrease. In other words, in the case of providing the LAF sensor on the upstream side from the PM treatment device, contrary to the case shown in FIG. 7 or 8, it is not possible to sufficiently lean out so that the PM oxidation reaction during deposition of PM progresses by only performing feedback control such that the LAF sensor output Vex simply converges to the target value Vop. For the above such reasons, in a case of providing the exhaust gas sensor to the upstream side from the PM treatment device (position P or position Q in FIG. 1), it is preferable to modulate the air/fuel ratio of the air/fuel mixture around a value established so that the LAF sensor output Vex converges to the target value Vop, by adding a modulation operation to the fuel correction amount dGfuel by the modulator 322 in FIG. 3. As shown in FIG. 9, it is thereby possible to also optimize the three-way purification reaction, while maximizing the oxidation of PM.

It should be noted that, although the effects in the case of providing the exhaust gas sensor to the downstream side of this PM treatment device have been explained while referencing FIGS. 7 and 8, with the presumption that a catalyst having a three-way purification function is provided in the filter of the PM treatment device, a case of not providing a three-way purification catalyst to the filter also exerts substantially the same effects.

Even in a case of a three-way purification catalyst not being provided to the filter, in a state in which PM is depositing in the filter and this is oxidizing, the exhaust gas sensor output Vex on the downstream side of the filter shifts to the rich side (low oxygen concentration side) by the amount consumed in oxidation, similarly to that down in the bottom graph in FIG. 8 or 9. For this reason, by performing feedback control so as to converge the exhaust gas sensor output Vex to the target value thereof. Vop during stoich operation, even without performing a modulation operation on the fuel injection amount, the air/fuel ratio of the air/fuel mixture automatically becomes leaner than a predetermined period stoich so that the oxidation of PM on the upstream side from the exhaust gas sensor and the oxidation of CO and HC in the direct-downstream catalytic converter are optimized.

Although an embodiment and modified example of the present invention have been explained above, the present invention is not to be limited thereto.

In the above-mentioned embodiment, a case is explained in which the direct-downstream catalytic converter 41 and the PM treatment device 46 are provided as separate bodies; however, the present invention is not limited thereto and may configure these integrally.

In addition, in the above-mentioned embodiment, an example is explained in which the under-floor catalyst is established as a selective reduction catalyst; however, the present invention is not limited thereto. The under-floor catalyst as mentioned above is effective even as a NOx storage-reduction type catalyst.

In addition, in the above-mentioned embodiment, a case of providing a catalyst having a three-way purification function to the filter of the PM treatment device 46 is explained; however, the present invention is not limited thereto. It may be configured so that only the function of collecting PM is assumed by the filter of the PM treatment device, without providing a three-way purification catalyst thereto.

Figure 10:
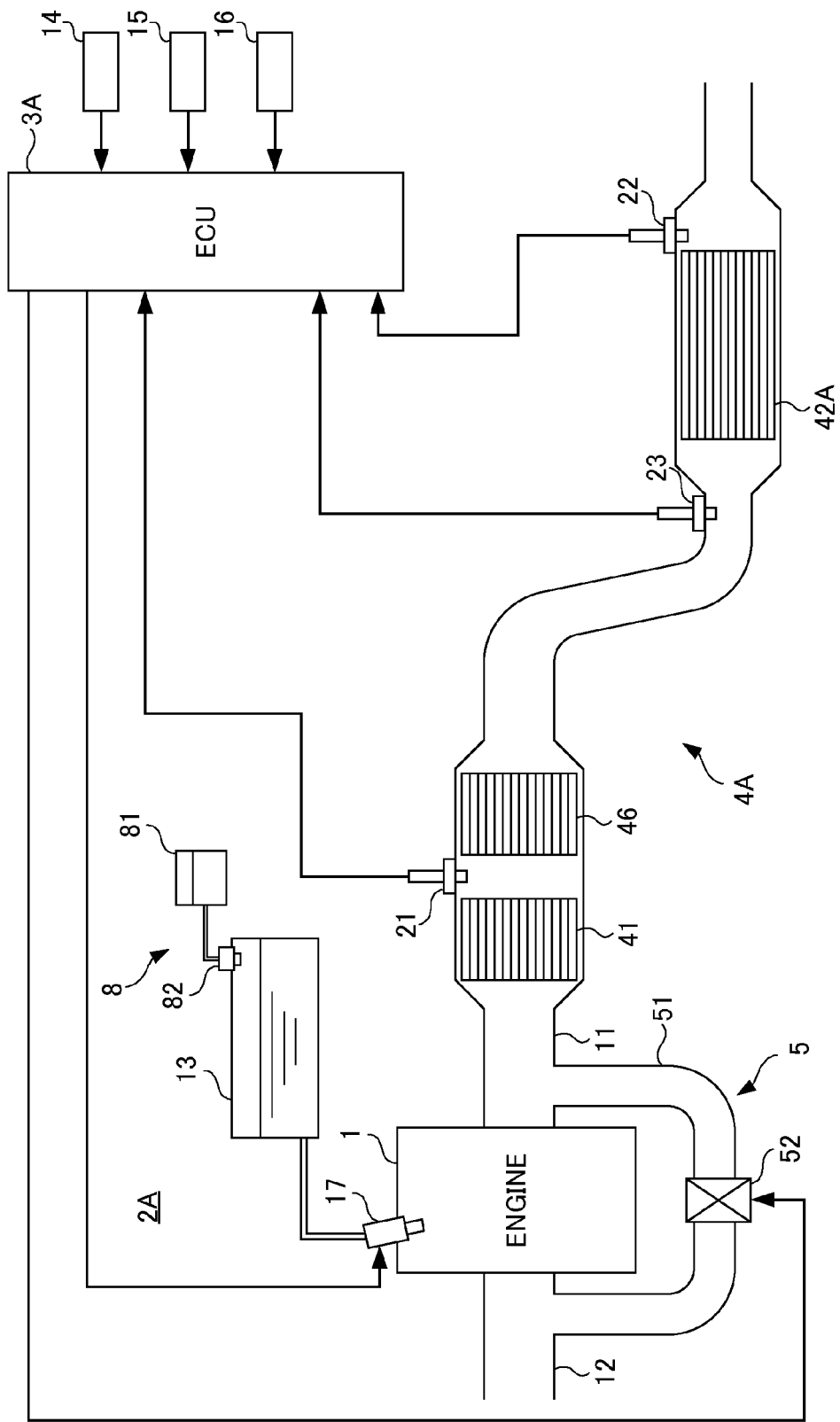
FIG. 10 is a view showing the configuration of an exhaust purification system in the case of an under-floor catalyst being established as a NOx storage-reduction type catalyst.

FIG. 10 is a view showing the configuration of an exhaust purification system 2A in the case of the under-floor catalyst of an under-floor catalytic converter 42A being established as a NOx storage-reduction type catalyst. With the exhaust purification system 2 of the above-mentioned embodiment, the reducing agent supply device 43 was required in order to supply reducing agent to the selective reduction catalyst. However, the NOx storage-reduction type catalyst uses HC in the exhaust gas as the reducing agent, it is not necessary to provide a reducing agent supply device with this exhaust purification system 2A. However, with this exhaust purification system 2A, the ECU 3A executes, as appropriate, air/fuel ratio control to make the air/fuel ratio of the exhaust gas temporarily stoich or richer than stoich in order to reduce NOx adsorbed by the NOx storage-reduction type catalyst during lean operation, separately from the air/fuel ratio control explained in the above-mentioned embodiment.

What is claimed is:

1. An exhaust purification system for an internal combustion engine that switches, at a predetermined condition, between lean operation that sets an air/fuel ratio of an air/fuel mixture to a leaner side than stoich and stoich operation that sets the air/fuel ratio of the air/fuel mixture to stoich or the vicinity thereof, the system comprising:
    a particulate matter treatment device that is provided in an exhaust channel of the engine and collects particulate matter in exhaust gas;
    a three-way purification catalyst provided on an upstream side from the particulate matter treatment device in the exhaust channel to be integrated or separate from the particulate matter treatment device, and in which a three-way purification reaction progresses during the stoich operation;
    an exhaust gas sensor that outputs a detection value according to an oxygen concentration of exhaust gas; and
    an air/fuel ratio control device that sets an operating mode of the engine to stoich operation under a predetermined operating condition at which setting the operating mode of the engine to stoich operation can improve the NOx purification performance of the exhaust purification system overall over setting to lean operation, and that feedback controls so that a detection value of the exhaust gas sensor becomes a target value established so that a three-way purification reaction in the three-way purification catalyst is optimized,
    wherein the air/fuel ratio control device includes a fuel controller that determines a fuel amount to supply to the engine so that the air/fuel ratio of the air/fuel mixture becomes leaner than a predetermined period stoich during the stoich operation,
    wherein the fuel controller determines a fuel amount so that a state in which the air/fuel ratio of the air/fuel mixture is leaner than stoich and a state richer than stoich are alternately realized, by applying a predetermined modulation algorithm to modulate the fuel amount determined so as to cause the detection value of the exhaust gas sensor to converge to the target value based on a predetermined feedback control algorithm.

2. The exhaust purification system for an internal combustion engine according to claim 1, wherein the exhaust gas sensor is provided on a downstream side of the particulate matter treatment device.

3. The exhaust purification system for an internal combustion engine according to claim 2, wherein the predetermined modulation algorithm is a $\Delta\Sigma$ modulation algorithm or a PWM modulation algorithm, wherein the fuel controller determines the fuel amount so that a state in which the air/fuel ratio of the air/fuel mixture is leaner than stoich and a state richer than stoich are alternately realized, by applying the predetermined modulation algorithm to binarize the fuel amount determined based on the predetermined feedback control algorithm.

4. The exhaust purification system for an internal combustion engine according to claim 1, wherein the fuel controller sets a variation width of the air/fuel ratio of the air/fuel mixture from stoich to a lean side to within 0.3 (A/F).

5. The exhaust purification system for an internal combustion engine according to claim 1, wherein the fuel controller modulates the fuel amount determined based on the feedback control algorithm only when during stoich operation and particulate matter collected in the particulate matter treatment device oxidizes.

6. The exhaust purification system for an internal combustion engine according to claim 5, further comprising an exhaust recirculation device that recirculates a part of the exhaust gas of the engine to intake air,
wherein the air/fuel ratio control device includes an air controller that calculates an exhaust recirculation rate or exhaust recirculation amount for controlling so as to cause the detection value of the exhaust gas sensor to converge to the target value, based on a predetermined feedback control algorithm.

7. The exhaust purification system for an internal combustion engine according to claim 6, wherein the convergence rate of the detection value of the exhaust gas sensor to the target value is set by the fuel controller so as to be faster than the convergence rate according to the air controller.

8. The exhaust purification system for an internal combustion engine according to claim 7, further comprising an additive supply device that supplies, to fuel to be supplied to the engine, an additive for causing a combustion temperature of particulate matter to decrease in the particulate matter treatment device.

9. The exhaust purification system for an internal combustion engine according to claim 8, wherein a first catalytic converter including the three-way purification catalyst is provided in the exhaust channel on an upstream side from the particulate matter treatment device, and a second catalytic converter that purifies NOx in exhaust gas during lean operation is provided downstream from the particulate matter treatment device.

10. The exhaust purification system for an internal combustion engine according to claim 9, wherein the predetermined operating condition includes a case of the second catalytic converter not having reached activation thereof, and a case of a value of a NOx correlation parameter which increases in accordance with a NOx amount discharged from the engine being greater than a predetermined value.

11. An exhaust purification system for an internal combustion engine that switches, at a predetermined condition, between lean operation that sets an air/fuel ratio of an air/fuel mixture to a leaner side than stoich and stoich operation that sets the air/fuel ratio of the air/fuel mixture to stoich or the vicinity thereof, the system comprising:
a particulate matter treatment device that is provided in an exhaust channel of the engine and collects particulate matter in exhaust gas;
a three-way purification catalyst provided on an upstream side from the particulate matter treatment device in the exhaust channel to be integrated or separate from the particulate matter treatment device, and in which a three-way purification reaction progresses during the stoich operation;
an exhaust gas sensor that outputs a detection value according to an oxygen concentration of exhaust gas; and
an air/fuel ratio control device that sets an operating mode of the engine to stoich operation under a predetermined operating condition at which setting the operating mode of the engine to stoich operation can improve the NOx purification performance of the exhaust purification system overall over setting to lean operation, and that feedback controls so that a detection value of the exhaust gas sensor becomes a target value established so that a three-way purification reaction in the three-way purification catalyst is optimized,
wherein the air/fuel ratio control device includes a fuel controller that determines a fuel amount to supply to the engine so that the air/fuel ratio of the air/fuel mixture becomes leaner than a predetermined period stoich during the stoich operation,
wherein the exhaust gas sensor is provided on a downstream side of the particulate matter treatment device,
wherein the fuel controller comprises:
a reference fuel amount calculation unit that calculates a reference fuel amount based on the operating mode and operating state of the engine;
a fuel correction amount calculation unit that calculates a fuel correction amount for the reference fuel amount so as to cause the detection value of the exhaust gas sensor to converge to the target value, based on a predetermined feedback control algorithm; and
a modulator that applies a predetermined modulation algorithm to modulate the fuel correction amount, and calculates a modulated correction amount, and
wherein the fuel controller determines a fuel amount by adding the modulated correction amount to the reference fuel amount.

12. The exhaust purification system for an internal combustion engine according to claim 11, wherein an amplitude of the fuel correction amount to a lean side or an amplitude of the modulated correction amount to the lean side is limited so as to be no more than 0.3 (A/F) by conversion to air/fuel ratio of the air/fuel mixture.

13. The exhaust purification system for an internal combustion engine according to claim 12, wherein the fuel controller modulates the fuel amount determined based on the feedback control algorithm only when during stoich operation and particulate matter collected in the particulate matter treatment device oxidizes.

14. The exhaust purification system for an internal combustion engine according to claim 13, further comprising an exhaust recirculation device that recirculates a part of the exhaust gas of the engine to intake air,
wherein the air/fuel ratio control device includes an air controller that calculates an exhaust recirculation rate or exhaust recirculation amount for controlling so as to cause the detection value of the exhaust gas sensor to converge to the target value, based on a predetermined feedback control algorithm.

15. The exhaust purification system for an internal combustion engine according to claim 14, wherein the convergence rate of the detection value of the exhaust gas sensor to the target value is set by the fuel controller so as to be faster than the convergence rate according to the air controller.

16. The exhaust purification system for an internal combustion engine according to claim 15, further comprising an additive supply device that supplies, to fuel to be supplied to the engine, an additive for causing a combustion temperature of particulate matter to decrease in the particulate matter treatment device.

17. The exhaust purification system for an internal combustion engine according to claim 16, wherein a first catalytic converter including the three-way purification catalyst is provided in the exhaust channel on an upstream side from the particulate matter treatment device, and a second catalytic converter that purifies NOx in exhaust gas during lean operation is provided downstream from the particulate matter treatment device.

18. The exhaust purification system for an internal combustion engine according to claim 17, wherein the predetermined operating condition includes a case of the second catalytic converter not having reached activation thereof, and a case of a value of a NOx correlation parameter which increases in accordance with a NOx amount discharged from the engine being greater than a predetermined value.

19. An exhaust purification system for an internal combustion engine that switches, at a predetermined condition, between lean operation that sets an air/fuel ratio of an air/fuel mixture to a leaner side than stoich and stoich operation that sets the air/fuel ratio of the air/fuel mixture to stoich or the vicinity thereof, the system comprising:

- a particulate matter treatment device that is provided in an exhaust channel of the engine and collects particulate matter in exhaust gas;
- a three-way purification catalyst provided on an upstream side from the particulate matter treatment device in the exhaust channel to be integrated or separate from the particulate matter treatment device, and in which a three-way purification reaction progresses during the stoich operation;
- an exhaust gas sensor that outputs a detection value according to an oxygen concentration of exhaust gas; and
- an air/fuel ratio control device that sets an operating mode of the engine to stoich operation under a predetermined operating condition at which setting the operating mode of the engine to stoich operation can improve the NOx purification performance of the exhaust purification system overall over setting to lean operation, and that feedback controls so that a detection value of the exhaust gas sensor becomes a target value established so that a three-way purification reaction in the three-way purification catalyst is optimized, wherein the air/fuel ratio control device includes a fuel controller that determines a fuel amount to supply to the engine so that the air/fuel ratio of the air/fuel mixture becomes leaner than a predetermined period stoich during the stoich operation, wherein the fuel controller sets a variation width of the air/fuel ratio of the air/fuel mixture from stoich to a lean side to within 0.3 (A/F).

* * * * *